United States Patent
Assa et al.

(10) Patent No.: US 6,313,837 B1
(45) Date of Patent: Nov. 6, 2001

(54) MODELING AT MORE THAN ONE LEVEL OF RESOLUTION

(75) Inventors: Steven Brent Assa, Storeys Way (GB); Richard Paul Hammersley; Hong-Qian Lu, both of Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 09/163,075

(22) Filed: Sep. 29, 1998

(51) Int. Cl.[7] .................................................. G06T 17/00
(52) U.S. Cl. ............................................ 345/420; 345/428
(58) Field of Search .................................. 345/420, 423, 345/428, 419

(56) References Cited

U.S. PATENT DOCUMENTS

| | | | |
|---|---|---|---|
| 4,314,338 | 2/1982 | Suau et al. | 364/422 |
| 4,340,934 | 7/1982 | Segesman | 364/422 |

(List continued on next page.)

FOREIGN PATENT DOCUMENTS

| | | | |
|---|---|---|---|
| 0 299 862 A2 | 1/1989 | (EP) | G01V/1/40 |
| 0 447 629 A2 | 9/1991 | (EP) . | |
| 0 745 870 A2 | 12/1996 | (EP) | G01V/1/28 |
| 2 300 736 A | 11/1996 | (GB) | G06F/19/00 |
| 2 309 562 A | 7/1997 | (GB) | G06F/17/00 |
| WO 91/04544 | 4/1991 | (WO) | G06F/15/72 |
| WO 95/30209 A | 11/1995 | (WO) . | |
| PCT/US 97/24278 | 5/1998 | (WO) . | |
| PCT/US 97/24279 | 6/1998 | (WO) . | |
| WO 98/27498 A | 6/1998 | (WO) . | |

OTHER PUBLICATIONS

Mallet, J. L., "GOCAD: A Computer–Aided Design Program for Geological Applications", Jun. 1989, pp. 1–37.

Mallet, J. L., "Discrete smooth interpolation in Geometric Modeling", Computer–Aided Design, vol. 24, No. 4, Apr. 1992, pp. 177–192.

Ames, Arlo, "Production ready feature recognition based automatic group technology part codling", proceedings of Symposium on Solid Modeling Foundations and CAP/CAM Applications, Rossignac/Turner editors, Austin, TX, Jun. 5–7, 1991, p. 161.

Baumgart, B., Winged–edge Polyhedron Representation:, Standford Artificial Intelligence Report, No. CS–320, Oct. 1972, pp. 1–46.

Briad, I. C. et al. "Stepwise construction of Polyhedran in Geometric Modeling", Mathematical Methods in Computer Graphics and Design, K.S. Brodie/Editor, Acdemic Press, 1980, pp. 123–141.

(List continued on next page.)

Primary Examiner—Mark Zimmerman
Assistant Examiner—Enrique L Santiago
(74) Attorney, Agent, or Firm—Howard L. Speight; Danita J. M. Maseles; Pehr B. Jansson

(57) ABSTRACT

A method, computer system and computer program are disclosed for representing a first surface at multiple levels of resolution. The first surface is partitioned into nodes with one or more boundaries, each level of resolution having a subset of the boundaries. A second surface may be classified against the first surface. Surfaces and the model may be decimated. Portions of the surfaces may be loaded from persistent memory on demand and removed when no longer required.

172 Claims, 26 Drawing Sheets

U.S. PATENT DOCUMENTS

| | | | |
|---|---|---|---|
| 4,679,174 | 7/1987 | Gelfand | 367/73 |
| 4,821,214 | 4/1989 | Sederberg | 364/522 |
| 4,858,149 | 8/1989 | Quarendon | 395/125 |
| 4,890,242 | 12/1989 | Sinha | 395/119 |
| 4,912,664 | 3/1990 | Weiss et al. | 364/577 |
| 4,922,254 | 5/1990 | Schuessler et al. | 342/25 |
| 4,928,233 | 5/1990 | Millis | 364/522 |
| 4,944,034 | 7/1990 | Ohsawa | 364/522 |
| 4,969,130 | 11/1990 | Wason et al. | 367/73 |
| 5,003,498 | 3/1991 | Ota et al. | 364/522 |
| 5,010,502 | 4/1991 | Diebel et al. | 364/522 |
| 5,012,431 | 4/1991 | Stanziola | 364/526 |
| 5,214,613 | 5/1993 | Esmersoy | 367/31 |
| 5,229,976 | 7/1993 | Boyd et al. | 367/73 |
| 5,309,360 | 5/1994 | Monk et al. | 364/420 |
| 5,355,088 | 10/1994 | Howard, Jr. | 324/339 |
| 5,359,526 | 10/1994 | Whittington et al. . | |
| 5,394,325 | 2/1995 | Schneider, Jr. | 364/421 |
| 5,497,452 | 3/1996 | Shimizu et al. . | |
| 5,553,492 | 9/1996 | Barrett et al. | 73/152.29 |
| 5,566,281 * | 10/1996 | Tokumasu et al. | 395/120 |
| 5,583,825 | 12/1996 | Carrazzone et al. | 367/31 |
| 5,621,872 * | 4/1997 | Tokumasu et al. | 395/142 |
| 5,647,058 | 7/1997 | Agrawal et al. | 395/601 |
| 5,648,937 | 7/1997 | Campbell | 367/27 |
| 5,682,330 | 10/1997 | Seaman et al. | 364/551.01 |
| 5,995,109 * | 11/1999 | Goel et al. | 345/423 |
| 6,078,331 * | 6/2000 | Pulli et al. | 345/423 |
| 6,108,006 * | 8/2000 | Hoppe | 345/468 |

OTHER PUBLICATIONS

Brown, A. R., Interpretation of Three–Dimenstional Seismic Data:, 3rd Ed., American Association of Petroleum Geologists, Tulsa, OK, 1986, pp. 67–177.

Celniker, G. et al., Deformable Curve and Surface Finite Elements for Free–Form Shape Design:, Computer Graphics, vol. 25, No. 4, 1991, pp. 257–266.

Celniker, G. et al., "Visualization and Modeling of Geophysical Data", Proceedings Visualization '93, San Jose, CA, Oct. 25–29, 1993, pp. 361–365.

da Silva, R. E. et al., "An Algebraic Approach to Geometric Query Processing in CAD/CAM Applications", proceedings of Symposium on Solid Modeling Foundations and CAD/CAM Applications, Rossignac & Turner editors, Austin, TX, Feb. 22, 1991, p. 73–86.

De Martino, T. et al., "Feature–based Modeling by Integrating Design and Recognition Approaches", Computer–Aided Design, vol. 26, No. 8, Aug. 1994, pp. 646–653.

Duan, W. et al.,"FSMT: A Feature Solid–Modeling Tool; for Feature–Based Design and Manufacture", Computer–Aided Design, vol. 25, No. 1, Jan., 1993, pp. 29–38.

Farin, G., "Curves and Surfaces for Computer Aided Geometric Design", Academic Press, 2nd ed., New York, 1990, pp. 101–150.

3D VSP–3D Vertical Seismic Profile Modeling, http://www.gxt.com/productinfo/3dvspinfo.html, GX Technology Corporation, Houston, TX.

Glassner, A. S., Useful 3D Geometry, Graphics Gems, Academic Press, ISBN 0–12–286165–5, pp. 296–571.

Heymans, M. et al., "Testing Hydrocarbon Saturation Models for use in Orginal Oil–In–Place Estimation:", South Dome of Oregon Basin Field, Park County, Wyoming, Computer Modeling of Geologic Surfaces and Volumes, AAPG Computer Applications in Geology, No. 1, The American Association of Petroleum Geologiests, pp. 105–121.

Hughes, T. J. R., The Finite Element Method—Linear, Static and Dynamic Finite Element Analysis, Prentice Hall, Englewood Cliffs, N. J., 1987, pp. 1–56.

Laakko, T. et al., "Feature Modeling by Incremental Feature Recognition", Computer–Aided Design, vol. 25, No. 8, Aug. 1993, pp. 479–492.

Lorenson, W. E., et al., "Marching Cubes: A High Resolution 3D Surface Construction Algorithm", Computer Graphics, vol. 21, No. 4, Jul. 1987, pp. 163–169.

Luo, Y. et al., "A Boundary Representation for Form Features and Non–Manifold Solid Objects", Proceedings of Symposium on Solid Modeling Foundations and CAD/CAM Applications, Rossignac & Turner editors, Austin, TX, Jun. 5–7, 1991, pp. 45–60.

Lovell, J., Finite Element Methods in Resistivity Logging, Ph.D. dissertation, Technical University Delft, 1993, pp. 1–176.

Millman, R. S. et al., Elements of Differential Geometry, Prentice Hall, Englewood Cliffs, N.J., 1977, pp. 173–242.

Munkres, J. R., Elements of Algebraic Topology, Benjamin/Cummings Publishing Co., Inc., Menlo Park, CA, 1984, pp. 1–146.

Pratt, M. J., "Synthesis of an Optimal Approach to Form Feature Modeling", in Proceedings of the ASME International Computers in Engineering Conference and Exhibition, San Francisco, CA, Jul. 31–Aug. 4, 1988, pp. 263–274.

Shah, J. J., et al., "Feature–Based Modeling Shell. Design and Implementation", Computers in Engineering, pp. 255–261, Dept. of Mech, and Aerospace Eng., Arizona St. University, Tempe, AZ, 1988, pp. 255–261.

Simmons, R. G., "Representing and Reasoning About Change in Geological Interpretation", Technical Report 749, MIT Artificial Intelligence Laboratory, Dec. 1983, pp. 6–121.

Weiler, K. J., Topological Structures for Geometric Modeling, Ph.D. thesis, Rensselaer Polytechnic Institute, Troy, New York, Aug., 1986, pp. 31–214.

Wyatt, K. D., et al., "Building Velocity–Depth Models for 3D Depth Migration", The Leading Edge, vol. 13, No. 8, Aug. 1994, pp. 862–866, pp. 862–866.

Teller, S. et al., "Partitoning and Ordering large Radiosity Computations", Computer Graphics Proceedings, Annual Conference Series, 1994, pp. 443–450.

Product Availability by Platform, http://www.gxt.com/product info/platformlist.html#3daims, GX Technology Corporation, Houston, TX.

Product Availability by Platform, http://www.gxt.com/productinfo/platformlist.html. GX Technology Corporation, Houston, TX.

Product Information, http://www.gxt.com/product info/productinfo.html. GX Technology Corpporation, Houston, TX.

Bode, T. et al. "First experiences with GEORSTORE, an information system for geologically defined geometrics" IGIS '94: Geographic Information System, International Workshop on Advanced Research in Geographic Information Systems. ISBN 3–540–58795—0 1994, Berlin, Springer–Verlag, Germany, pp. 35–44. XP002064462.

Jones, C. B. "Data structures for three–dimensional spatial information systems in geology, "International Journal of Geographical Information Systems, Jan.–Mar. 1989, UK, vol. 3, No. 1, ISSN 0269–3798, pp. 15–31, XP002064461.

Raafat, Hazem M. "An extended relational database for remotely sensed image data management within GIS, "IEEE Transactions on Geoscience and Remote Ssensing, vol. 29, No. 4, Jul. 1991, New York, pp. 651–655, XP000258538.

Jesperson, S. K., et al., "Modeling of Received Signals from Interfaces of Arbitrary Geometry", 1995 IEEE Ultrasonics Symposium, published Jul. 11, 1995, pp. 1561–1565.

Benediktsson, J. A., et al., "Classification and Feature Extration of AVIRIS Data", IEEE Transactions on Geoscience and Remote Sensing, vol. 33, iss. 5, Sep. 1995, pp. 1194–1205.

Brown, P. et al., "Collection and Quality Control of Marine Geological Data by the Ocean Drilling Program", OCEANS '88: A Partnership of Marine Interests, 1988, pp. 1012–1017.

Duff, B. L., et al., "Applications of Object–Oriented Approaches to Expert Systems in the Earth Sciences", Developing and Managing Expert System Programs, 1991, pp. 160–165.

Roelofs, L. H., et al., "Applying Semantic Data Modeling Techniques to Large Mass Storage System Designs" Mass Storage Systems, 1990 10th IEEE Symposium, 1990, pp. 65–76.

Starks, S. A., et al., "Navigating Large Databases Using a New High–Level Computer Language", NORTHCON/95 1995, pp. 49–54.

Young, J. A. et al., "A computer–Aided Geological Interpretation System for Subsurface Imaging", Geoscience and Remote Sensing, 1994 Symposium, pp. 854–856.

Zhou, Guan–Xiong, et al., "An Expert System for Pattern recognition Based on Features and Knowledge", Pattern Recognition, 1998 9th International Conference, 1988, pp. 1239–1241.

\* cited by examiner

| N x N Grid | Simplifies to be rendered | Rendering Time (see) | Rendering Rate (tris per see) |
|---|---|---|---|
| 100 x 100 | 19602 | 0.053 | 190226 |
| 160 x 160 | 50562 | 0.099 | 198000 |
| 225 x 225 | 100352 | 0.247 | 204704 |
| 318 x 318 | 200978 | 0.941 | 213579 |
| 355 x 355 | 250632 | 1.152 | 217562 |
FIG. 15
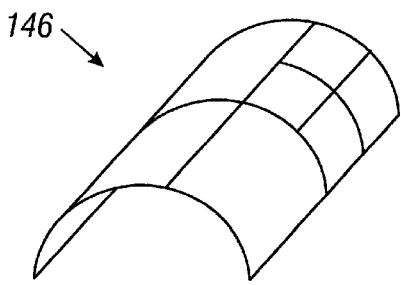
FIG. 16A
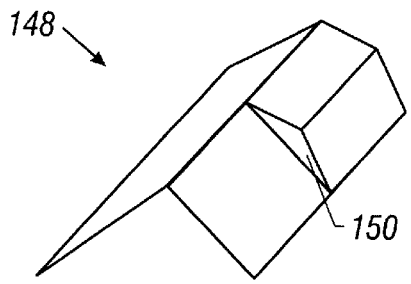
FIG. 16B
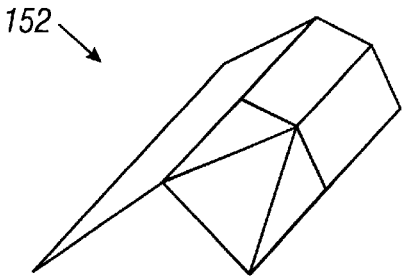
FIG. 16C

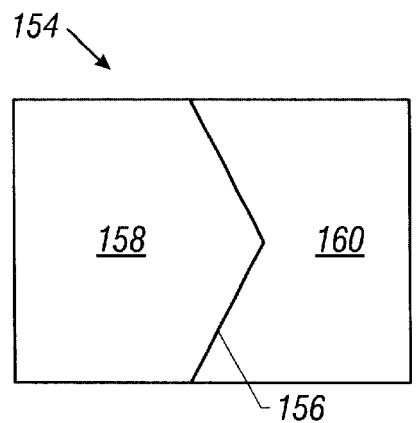 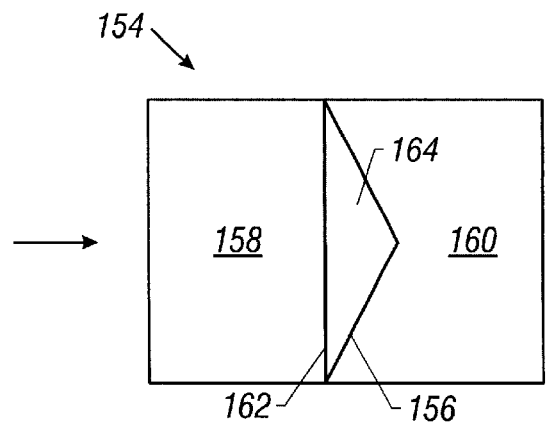
FIG. 17A    FIG. 17B
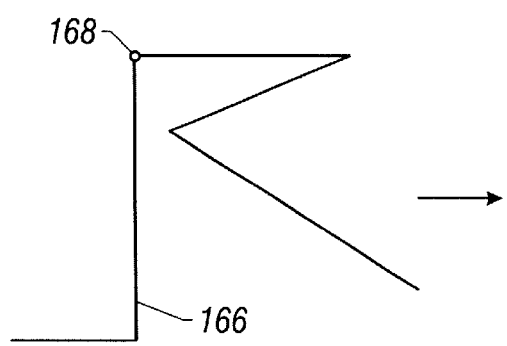 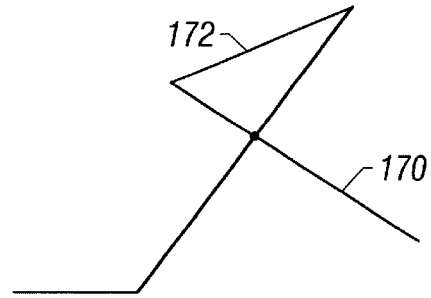
FIG. 18A    FIG. 18B

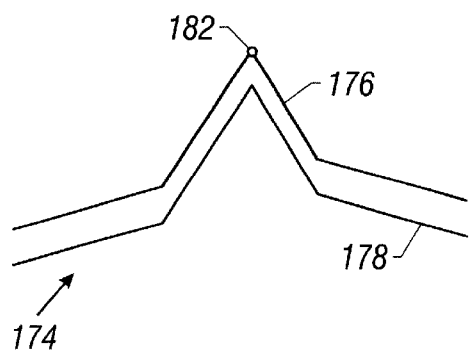
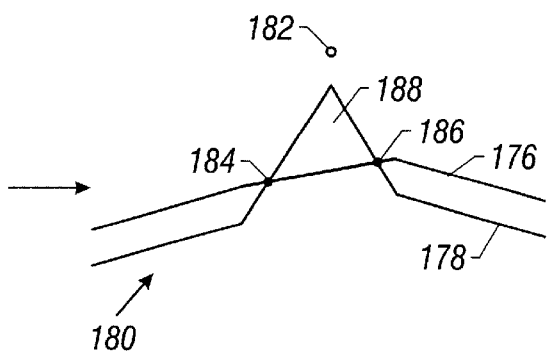
FIG. 19A  FIG. 19B
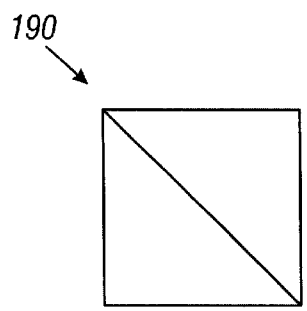
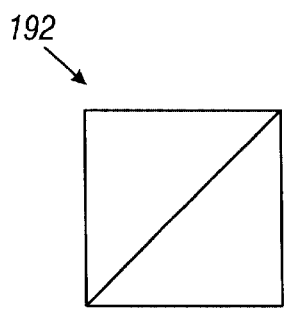
FIG. 20A  FIG. 20B

| Depth $d$ | Size of grid $n \times n$, $n = 2d$ | #bits for key $2d + ceil(log2(d+1))$ | #leaf nodes $4d$ | #nodes $\Sigma_{i=0}^{d} 4^i$ |
|---|---|---|---|---|
| 0 | 1 | 0 | 1 | 1 |
| 1 | 2 | 3 | 4 | 5 |
| 2 | 4 | 6 | 16 | 21 |
| 3 | 8 | 8 | 64 | 85 |
| 4 | 16 | 11 | 256 | 341 |
| 5 | 32 | 13 | 1024 | 1365 |
| 6 | 64 | 15 | 4096 | 5461 |
| 7 | 128 | 17 | 16384 | 21845 |
| 8 | 256 | 20 | 65536 | 87381 |
| 9 | 512 | 22 | 262144 | 349525 |
| 10 | 1024 | 24 | 1048576 | 1398101 |
| 11 | 2048 | 26 | 4194304 | 5592405 |
| 12 | 4096 | 28 | 16777216 | 22369621 |
*FIG. 23*
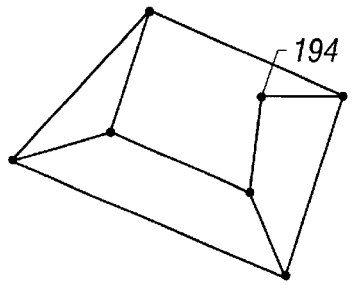
*FIG. 24A*
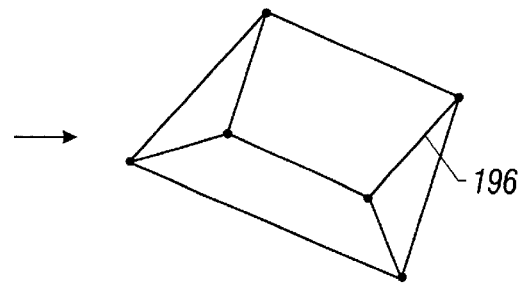
*FIG. 24B*
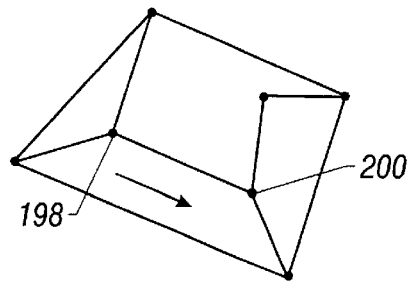
*FIG. 25A*
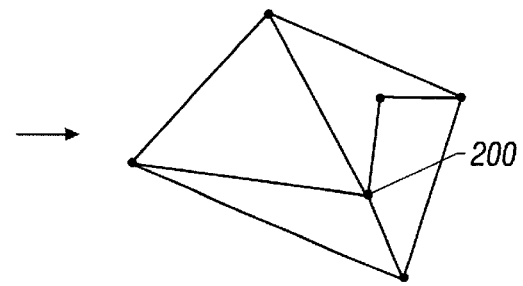
*FIG. 25B*

- parent critical
- ⊘ edge critical
- ○ sub-critical

| Surface | Eular Characteristic | g | r |
|---|---|---|---|
| torus | 0 | 1 | 0 |
| cylinder with zero caps | 0 | 0 | 2 |
| frustrum | 0 | 0 | 2 |
| truncated square based pyramid | 0 | 0 | 2 |
| annulus | 0 | 0 | 2 |
| disk, square or triangle | 1 | 0 | 1 |
| sheet with N holes | 1-N | 0 | 1+N |
| cone | 1 | 0 | 1 |
| cylinder with one cap | 1 | 0 | 1 |
| punctured sphere | 1 | 0 | 1 |
| sphere | 2 | 0 | 0 |
| cylinder with two caps | 2 | 0 | 0 |

*FIG. 34*

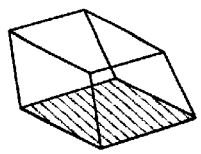
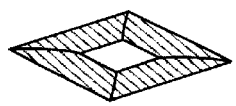
FIG. 38A  FIG. 38B
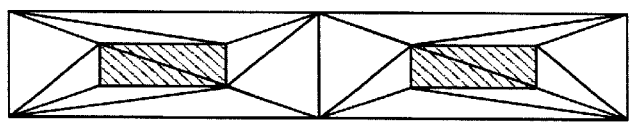
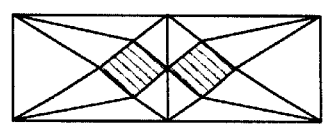
FIG. 39A  FIG. 39B
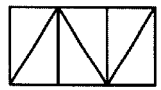
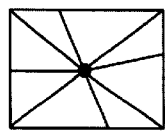
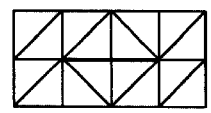
FIG. 40A  FIG. 40B  FIG. 40C
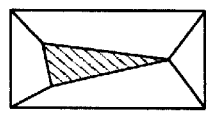
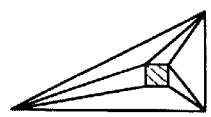
FIG. 41A  FIG. 41B

MODELING AT MORE THAN ONE LEVEL OF RESOLUTION

BACKGROUND OF THE INVENTION

This application relates to representing computer models and more particularly to representing a geometry model at more than one level of resolution.

The accurate representation of subsurface topology can have a profound effect on the interpretation of a geoscience model. This is mainly due to the presence of material properties such as, for example, oil. For a more detailed introduction on the importance of topology, see U.S. patent application Ser. No. 08/772,082, entitled MODELING GEOLOGICAL STRUCTURES AND PROPERTIES.

Imagine, for example, the situation of two compartments 10a, 10b separated by a sealed fault 12 (a sealed fault is an impermeable membrane that does not permit fluids to pass), as shown in FIG. 1. Due to the sealed fault there can be no flow of fluid from compartment 10a to compartment 10b. If both compartments were to contain oil it would be necessary to drill into both compartments to recover the oil.

Now suppose the sealed fault 12 is punctured, as shown in FIG. 2. There is now a free flow of fluid between compartment 10a and compartment 10b so it would be possible to drill just into one of the compartments to extract the oil.

Thus, having the correct topology in the geoscience model can have a profound effect on the finances of an oil-field development.

Another important concept in interpreting geoscience models presented graphically on a computer screen is the concept of multiresolution analysis, whereby an analyst can view an area of interest in the geoscience model at different resolution levels. There are many techniques that have been developed for multiresolution analysis of surfaces. The work falls into two principal categories. The first is to use wavelets. The second is to use edge contraction and edge flipping, which is sometimes called "topological editing".

Wavelets have found wide acceptance in image processing and recently have found application in surface representations. Typically, wavelets are used in a subdivision fashion. A typical subdivision scheme uses quaternary subdivision. For example, as shown in FIG. 3, a triangle 14 may be subdivided into four triangles 16a–d. In the example shown in FIG. 3, the retessellation conforms to the subdivision scheme. That is, the retessellation of the triangle into four triangles conforms with the quaternary subdivision scheme. It can be imagined, however, that if a different local retessellation of the triangle is performed, it may not be clear how to rebuild the subdivision scheme, since the refinement may not conform to the subdivision scheme. For example, if the triangle 14 is retessellated as in FIG. 3b into triangles 17a and 17b, the retessellation does not conform to the quaternary subdivision scheme. There has been no work on the integration of wavelets and boundary representations.

Topological editing, or editing a mesh using the topological operations of vertex removal, edge contraction and edge flipping, can be used to build multiresolution surfaces. Some mesh building techniques build a history of topological operations which permits progressive and partial loading of the surface, but it is not clear how this history is modified if a triangle is refined. There has been no work on the integration of topological editing and boundary representations.

SUMMARY OF THE INVENTION

In general, in one aspect, the invention features a method, computer system and computer program for representing a first surface at multiple levels of resolution. The first surface comprises zero or more zero-cells, zero or more one-cells and one or more two cells. The method is implemented in a programmed computer comprising a processor, a memory, a persistent storage system, at least one input device, and at least one output device. The method and a model are stored on a computer-readable media and the method represents the model on one of the output devices. The method comprises partitioning the first surface with one or more boundaries, each level of resolution having a subset of the boundaries.

Implementations of the invention may include one or more of the following. The first surface may be partitioned into $n_i$ nodes at resolution level-i using the level-i subset of boundaries. Each level-i+1 node may be associated with a unique level-i node. Each level-i node may be associated with the level-i+1 nodes associated to the node. Each level-i node may be associated with a subset of vertices that are critical at resolution level i. Assuming level d is the deepest level of resolution and the first surface is divided into simplices, each node at resolution level d may be designated a leaf node, each simplex may be associated to a unique leaf node, and each leaf node may have associated with it the simplices associated to that leaf node.

A level-i node may have associated with it the list of simplices which is the union of all simplices associated with the level-i+1 nodes associated to the level-i node. The subset of boundaries for each node may be assigned to be the boundary of the union of the simplices associated with that node. The nodes may form an original tree and each node may be assigned a unique key. Each vertex in a leaf node may be assigned the key corresponding to that leaf node.

The representation of a second surface may be stored in the computer-readable media, the second surface having nodes, leaf nodes, vertices, critical vertices and simplices. It may be determined which leaf nodes of the first surface intersect the leaf nodes of the second surface and the intersecting simplices from the first and second surfaces from the simplices associated to the intersecting leaf nodes.

Each node except the leaf nodes may have a subtree, and the original tree may be split into new trees and each new tree may be associated with a new cell. The subtrees of the original tree which have no intersecting leaf nodes may be identified with one of the new cells. The simplices of the first surface may be split along the intersection curve. New simplices may be formed by tessellating the split simplices to respect the macro-topology of one-cells and zero-cells passing through the original simplices. A new tree may be built for each new cell and each new simplex may be assigned to the leaf node of the tree created for the new cell to which the new simplex belongs. For each leaf node of each new tree, each simplex in the original tree which is connected to a new simplex in the new tree leaf node and which lies in the same tree leaf node as the new simplex may be migrated. The neighbors of a tree node may be determined by finding all the keys of all the critical vertices in the node. The coarsest level node which is an ancestor of a key from the critical vertices in the migrated tree nodes and has not been split or migrated may be determined and that node may be migrated to the new tree.

A complete node front of the tree of the first surface and a collection of vertices on a boundary of the first surface may be defined. A list of critical vertices from the tree nodes of the complete node front may be built. Those vertices identified to one- or zero-cell vertices may be removed from the list and all zero-cell vertices from the model which lie in the first surface and the defined collection of one-cell vertices may be added to the list. The collection of one-cell edges may be recorded. The surface may be tessellated to respect the list of vertices and the recorded one-cell edges.

The subset of vertices on the boundary of the first surface which are also on the boundary of the second surface may be required to be the same as the subset of vertices on the boundary of the second surface which are also on the boundary of the first surface.

A geometrical representation of the first surface may be maintained in a persistent storage.

A bounding box for each node may be stored on a persistent storage device, and for each node a list of critical vertices associated with that node may be stored on the persistent storage device. Storing the list of critical vertices may comprise storing a vertex descriptor for each vertex, storing a parameter value for each vertex, and storing an image value for each vertex. That portion of the first surface required may be loaded on demand from persistent storage and that portion of the first surface not required may be removed from memory. A tree node may be loaded from persistent storage on demand and removed from memory when it is no longer required. Simplices associated with a tree leaf node may be loaded from persistent storage on demand and removed from memory when no longer required.

In general, in another aspect, the invention features a method, computer system and computer program for representing a first surface at multiple levels of resolution. The method is implemented in a programmed computer comprising a processor, a data storage system, at least one input device, and at least one output device. The method and a model are stored on a computer-readable media and the method represents the model on one of the output devices. The method comprises storing a grid representation of the first surface, the grid representation being made up of grid cells, forming a mesh representation of a portion of the first surface by triangulating a subset of the grid cells, and inserting the first surface into the model.

BRIEF DESCRIPTION OF THE DRAWINGS

FIGS. 1, 2, 5a, 5b, 6a, and 35–41 are representations of models.

FIG. 15 is a table of rendering times and rates.

FIGS. 16a–c illustrate cracking caused by approximation.

FIGS. 17a–b illustrate cracking caused by approximation.

FIGS. 18a–b illustrate bubbling caused by approximation.

FIGS. 19a–b illustrate bubbling caused by approximation.

FIGS. 20a–b illustrate the two possible triangulations of a grid cell.

FIG. 23 is a table showing the size of the different components of a quadtree.

FIGS. 24a–b illustrate the effect of removing a non-critical vertex through approximation.

FIGS. 25a–b illustrate the effect of removing a critical vertex through approximation.

FIG. 34 is a table listing common surfaces and their Euler Characteristics.

FIG. 35 illustrates embedded disc obstructions that may be found in an external boundary.

FIG. 36 illustrates a method for removing a particular type of obstruction.

FIG. 37 illustrates a method for determining the contour formed from the set of all vertices connected to a recently defined contour.

FIG. 38 illustrates projecting an upper contour of a truncated square-based pyramid onto the interior of a square defined by the lower contour of the pyramid.

FIG. 39 illustrates square based pyramids with contours meeting in a non-manifold manner.

FIG. 40 illustrates contours being the boundary of an embedded disk.

FIG. 41 illustrates pyramids formed with triangle caps and square bases.

DESCRIPTION OF THE PREFERRED EMBODIMENTS

Figure 1:
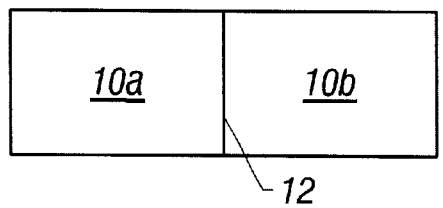
Figure 2:
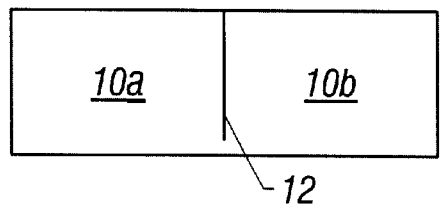
Figure 3A:
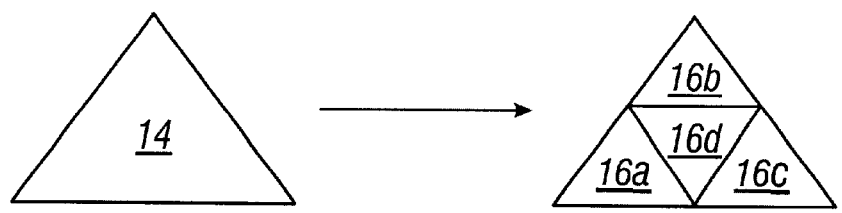
FIGS. 3a and 3b are representations of prior art multi-resolution analysis schemes.
Figure 3B:
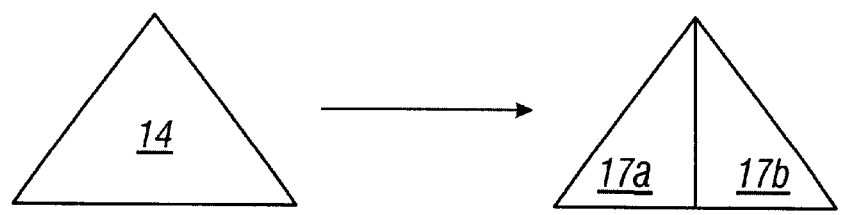
Figure 4:
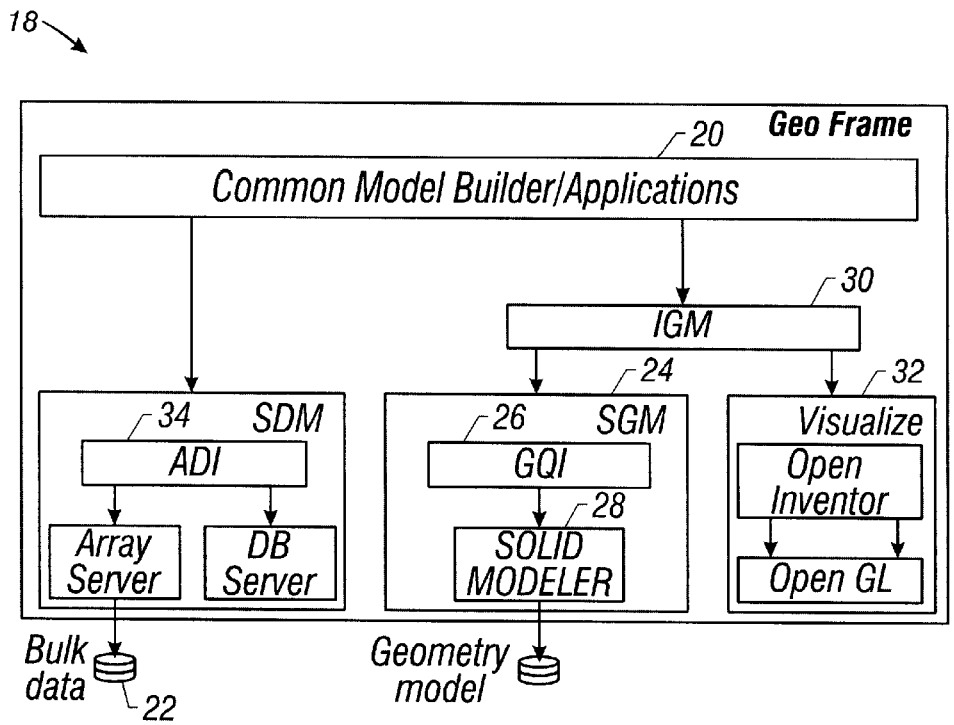
FIG. 4 is a block diagram.

A geoscience environment 18, called GeoFrame, comprises an application framework 20 which comprises a shareable database 22, a geometry modeler (SGM) 24, a geometry query interface (GQI) 26, a solid modeler 28, an interactive geometric modeling library (IGM) 30 and a renderer (Visualize) 32, as shown in FIG. 4 and explained in U.S. patent application Ser. No. 08/772,082, entitled MODELING GEOLOGICAL STRUCTURES AND PROPERTIES, incorporated by reference.

An application accesses shareable database instance data using the Application Data Interface (ADI) 34. The ADI provides a programmatic interface to the shareable database 22. The geometry modeler (SGM) 24 describes the part of the shareable database 22 specific to 3D geometrical modeling. An application accesses SGM instance data using the GQI 26.

The GQI provides a procedural interface to access the SGM. The GQI also provides a stable interface to a low-level non-geologic solid modeler 28 and adds extra organization to the low-level geometric representations to aid geological understanding.

The GQI is implemented on top of a low-level geometric solid modeler 28, such as SHAPES™ from XOX.

The Interactive Geometric Modeler (IGM) 30 provides visualization services on behalf of and a graphical interface to the GQI. An application normally receives human instruction through the IGM.

The IGM is implemented on top of a low-level rendering engine 28, such as a combination of OPENINVENTOR and OPENGL.

The Common Model Builder 20 is a toolkit that brings together the 3D geometric modeling components. It integrates data management services, geometric modeling and graphical interfaces for human input. The Common Model Builder provides an abstract framework upon which a 3D geoscience application can be built.

The GQI clearly distinguishes between the notions of topology and geometry. Broadly, topology refers to the connectivity between components in the model and generally refers to "macro-topology", described below. Geometry refers to the actual point-set representation of a particular component, for example.

Macro-topology carries the relationships between the major topological components of a model. The major topological components refer to points, edges (curves), faces (surfaces), and subvolumes. For example, macro-topology would answer a question such as "which surfaces bound a particular volume?" or "which surfaces lie within a particular volume?". Macro-topology does not need to consider the underlying geometry of surfaces and can work with many different types of geometrical representations, for example NURBs and meshes. Macro-topology is implemented in the SHAPES solid modeler 28.

Figure 5A:
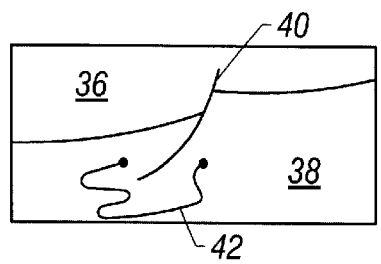
Figure 5B:
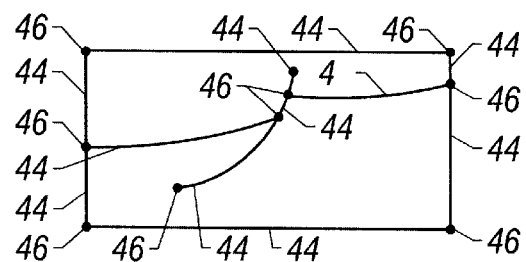

In the terminology of the GQI, macro-topology is represented by cells. A cell is a path-connected subset of Euclidean space of a fixed dimension. Path-connected means any two points in the cell can be connected by a path in the cell. The dimension refers to the dimension of the geometry of the cell, a 0-cell is a point, a 1-cell is an edge (curve), a 2-cell is a face (surface) and a 3-cell is a volume. For example, areas 36 and 38 are distinct cells separated by fault 40, as shown in FIG. 5a. Curve 42 illustrates the path-connected character of cell 38. Similarly, as shown in FIG. 5b, the line segments 44 between i ntersection points and the intersection points 46 themselves are cells.

Figure 6A:
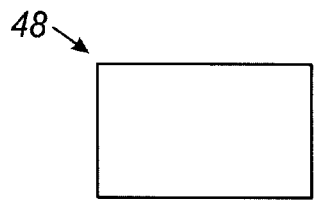
Figure 6B:
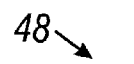
FIG. 6b is a representation of the geometry of a model.
Figure 6C:
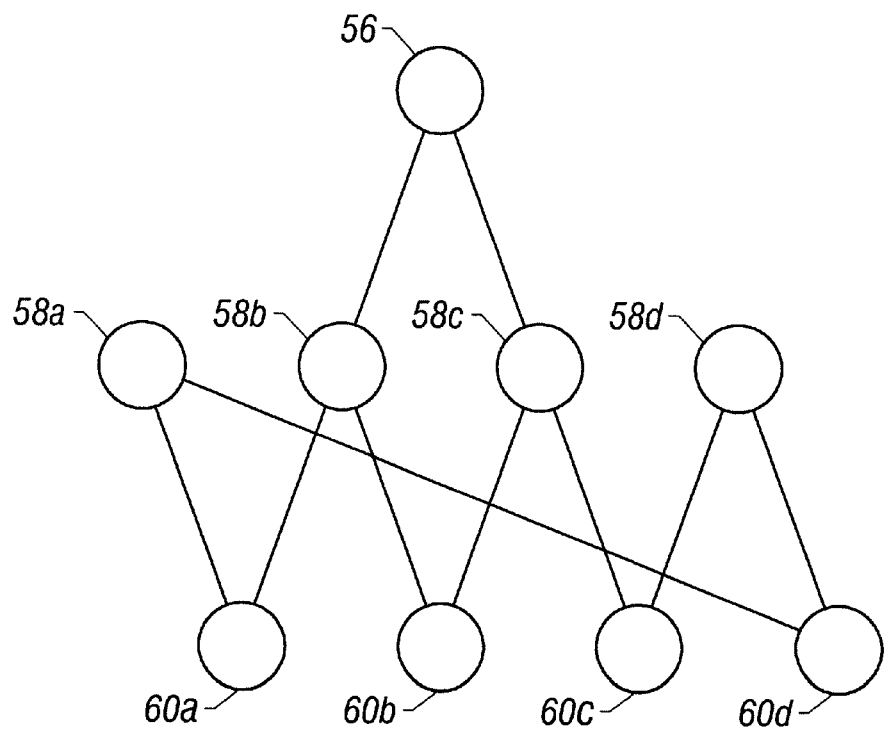
FIG. 6c is a topology graph.

The topology of a geometric model is the set of all cell-cell connectivity relationships. The cell-cell connectivity relationships can be represented in a graph in which the arcs of the graphs represent connectivity and the nodes represent cells, as shown in FIGS. 6a–c. In a cellular model, cells of dimension n are connected to boundary cells of dimension n−1 and vice versa. For example, in the topology of a box 48, shown in FIG. 6a, the area cell 50 is connected to its four bounding edge cells 52a–d. A single cell can act both as a boundary and as a region. For example, a surface can bound a subvolume, but can itself be bounded by a set of curves. The 1-cells 52a–d, in FIG. 6b, are both subregions (bounded by zero-cells 54a–d) and boundaries (of area cell 50). These relationships can be represented graphically, as shown in FIG. 6c. Node 56, corresponding to area cell 56, is connected to nodes 58a–d, representing 1-cells 52a–d, respectively. The connection between the nodes is represented by the arcs between them. 1-cells 58a–d are connected to zero-cells 60a and 60d, 60a and 60b, 60b and 60c, and 60c and 60d, respectively. Cells which are contained in higher-dimensional cells but do not split them (such as fault 40 in FIG. 5a) are said to be "embedded".

Geometry is the point-set description of a topological object. For example, a geometrical query would be "which is the closest point on the surface to a given point?".

All geometry to be considered here is piecewise linear. For convenience, a brief review of the definition and topological properties of a simplex, simplicial complex, and triangulated surface or mesh is included below. In short, the piecewise linear geometry of an 1-cell or edge is a polyline, for a 2-cell or face it is a triangular mesh and for a 3-cell it is a tetrahedral mesh.

Let $a_0, \ldots, a_r$ be a collection of r+1 linearly independent points in $R^n$ with $r \leq n$. The r-dimensional simplex $\sigma = (a_0, \ldots, a_r)$ is the set of all points in $R^n$ such that $$\sigma = \left\{ x \in R^n | x = \sum_{i=0}^{r} t_i \cdot a_i, t_i \geq 0, \sum_{i=0}^{r} t_i = 1 \right\}$$

The r-tuple $(t_0, \ldots, t_r)$ is the barycentric coordinate of x. The $\{a_i\}$ are the simplex's corner points.

Figure 7A:
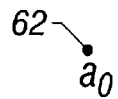
FIGS. 7a–7d illustrate simplices.
Figure 7B:
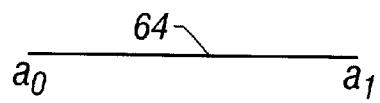
Figure 7C:
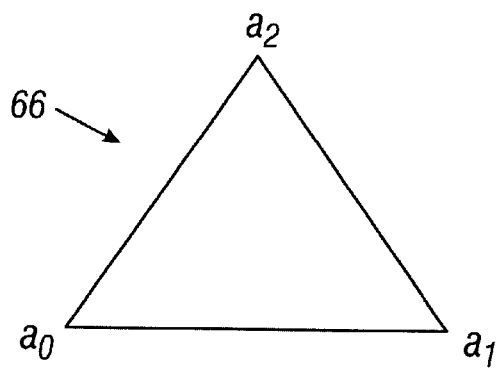
Figure 7D:
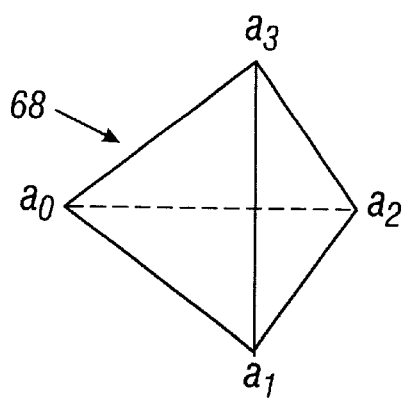

A 0-simplex is a point 62, illustrated in FIG. 7a, and a 1-simplex is the line segment 64 joining, for example, $a_0$ to $a_1$, as shown in FIG. 7b. A 2-simplex is a filled triangle in 3-space 66, the triangle being defined by the three corner points, as shown in FIG. 7c. Similarly, a 3-simplex is a filled tetrahedron 68 defined by the four corner points, as shown in FIG. 7d.

Let $\sigma = (a_0, \ldots, a_r)$ be an r-simplex and let q be an integer with $0 \leq q \leq r$. Now choose q+1 distinct points from $a_0, \ldots, a_r$, say $a_{i0}, \ldots, a_{iq}$, these q points define a q-simplex which is called a q-face of $\sigma$.

An n-simplex has n+1 n−1-faces. These faces are exactly the faces expected, that is the 0-faces of a 1-simplex are the end points, the 1-faces of a 2-simplex are the bounding lines, the 2-faces of a 3-simplex are the triangular faces of the tetrahedron.

A simplicial complex, K, is a finite collection of simplices in some $R^n$ satisfying 1. If $\sigma \in K$, then all the faces of $\sigma$ belong to K
2. If $\sigma, \tau \in K$ then either $\sigma \cap \tau$=null or $\sigma \cap \tau$ is a common face of $\sigma$ and $\tau$.

Figure 8A:
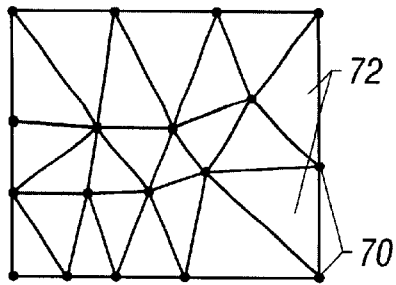
FIGS. 8a, 8b and 8c illustrate a simplicial complex, a simplicial complex with a hole and an illegal simplicial complex, respectively.
Figure 8B:
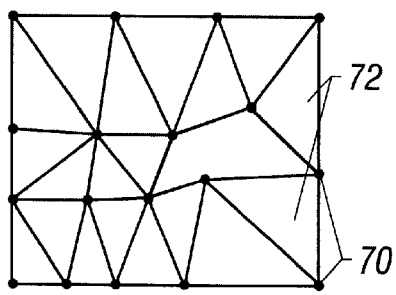
Figure 8C:
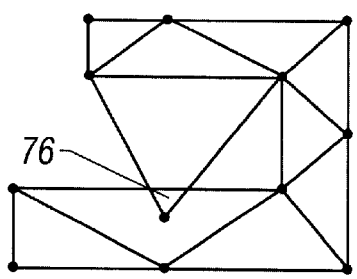

Examples of legal simplicial complexes include a simplicial complex with vertices, e.g. 70, and simplices, e.g. 72, as shown in FIG. 8a, and a simplicial complex with a hole 74, as shown in FIG. 8b. Overlapping simplices, e.g. 76, create an illegal simplicial complex, as shown in FIG. 8c The "dimension" of a simplicial complex is −1 if K=null, and the maximum dimension of the simplices of K otherwise.

Given a collection of simplices C from the simplicial complex K, the collection C defines another simplicial complex by considering all the faces of C:

$$\text{SimpComp}(C) = \{\sigma \in K | \sigma \text{ is a face of a simplex in } C\}$$

Let K be a simplicial complex and define:

$$\Delta_s^r(K) = \left\{ \tau \middle| \begin{array}{l} \tau \text{ is an } s\text{-simplex} \\ \tau \text{ is the face of exactly } r \text{ distinct } s+1 \text{ simplices} \\ \tau \text{ is not the face of any } s+2 \text{ simplices} \end{array} \right\}$$

and $$\delta_s^r(K) = \text{SimpComp}(\Delta_s^r(K))$$

A pseudomanifold, M, is a simplicial complex such that
1. M is homogeneously n-dimensional. That is, every simplex of M is a face of a n-simplex of M.
2. Every (n−1)-simplex of M is a face of at most two n-simplices.

3. If σ and σ' are two distinct n-simplices of M, then there exists a sequence $\sigma_1, \ldots, \sigma_k$ of n-simplices in M, such that $\sigma_1=\sigma$, $\sigma_k=\sigma'$ and $\sigma_i$ meets $\sigma_{i+1}$ in a (n−1)-face for $1 \leq i \leq k-1$.

Figure 9:
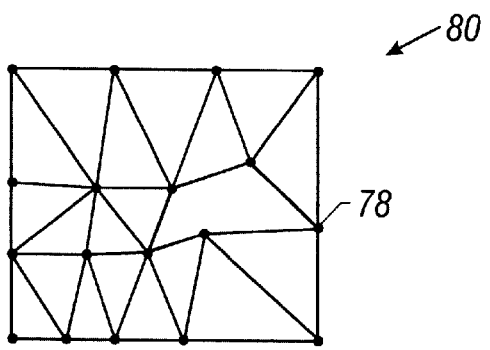
FIG. 9 illustrates a non-manifold triangulated surface.

A triangulated surface or mesh is a two-dimensional pseudo-manifold. The presence of a singular vertex 78, as shown in FIG. 9, means that the triangulated surface 80 is not a manifold, but it is a pseudo-manifold.

For an n-homogenous simplicial complex K, i.e. every simplex is a face of some n-simplex, the following can be seen to hold:

$$\delta_0^0(K) = \delta_1^0(K) = \ldots = \delta_{n-1}^0(K) = \text{null}$$

The boundary of a simplicial complex K of dimension n, is given by the collection of simplices:

$$\delta(K) = \delta_0^1(K) \cup \delta_1^1(K) \cup \ldots \cup \delta_{n-1}^1(K)$$

For an homogenous simplicial complex of dimension n, the boundary reduces to:

$$\delta(K) = \delta_{n-1}^1(K)$$

The boundary of an homogenous simplicial complex K of dimension n is itself an homogenous simplicial complex of dimension n-1. However, the boundary of a pseudo-manifold is not necessarily a pseudo-manifold.

Denote by Simps(v) the set of 2-simplices which connect to the vertex v in a triangle mesh.

Denote by Verts(S) the set of vertices forming the corners of the 2-simplex S.

Any surface representation must be able to pass geometry to the underlying geometry engine. The SHAPES geometry engine uses micro-topology for this purpose.

Micro-topology is an example of a mesh representation. The mesh representation is an integral part of the surface representation. It is sufficient for the mesh representation to support basic navigation queries, such as, "which simplices use a vertex?" and "which vertices are used by a simplex?". Using these two queries it is possible to navigate from a simplex to a vertex and then from this vertex back to another simplex. In this way it is possible to determine connected components in a model. Micro-topology supports these types of queries.

An additional requirement, which is imposed by the SHAPES geometry engine, is that all intersection curves must be supported by micro-topology.

For the purposes of the surface representation it is necessary to know which vertices lie on the boundary of a surface. This information is maintained by the SHAPES geometry engine and permits efficient queries identifying whether a vertex is identified to a 1-cell vertex or a 0-cell vertex.

An additional requirement imposed by the SHAPES geometry engine is that all vertices which are identified with a 1-cell or 0-cell vertex and all boundary simplices are retained in core memory at all times.

One of the algorithms provided by the GQI is classification. Given two cells, A and B, classification subdivides the respective point sets into an inside part, an outside part, and a part on the boundary of the other. In set theoretic terms, the union of A and B breaks into three disjoint components, the part of A which is not in B (AB), the part of B which is not in A (BA) and the intersection of A and B:

$$A \cup B = A \backslash B \cup B \backslash A \cup (A \cap B)$$

$$A \backslash B \cap B \backslash A = \text{null set}$$

$$A \backslash B \cap (A \cap B) = \text{null set}$$

$$B \backslash A \cap (A \cap B) = \text{null set}$$

When performing the classification, the GQI identifies the connected components or cells in the model, connects these cells along their shared boundaries, throws away the original cell definitions and builds new cell definitions for the connected components. The outcome is an Irregular Space Partition (ISP).

Figure 10A:
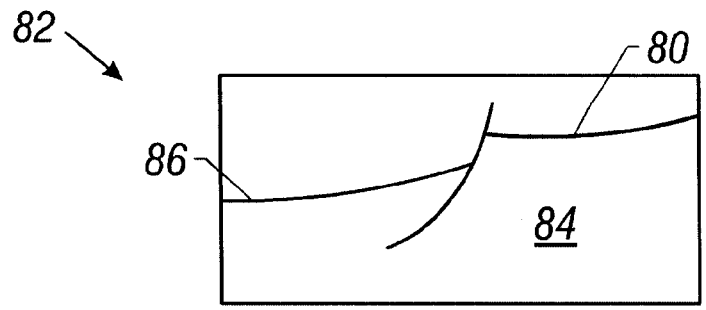
FIGS. 10a–10c illustrate classification of one surface into another.
Figure 10B:
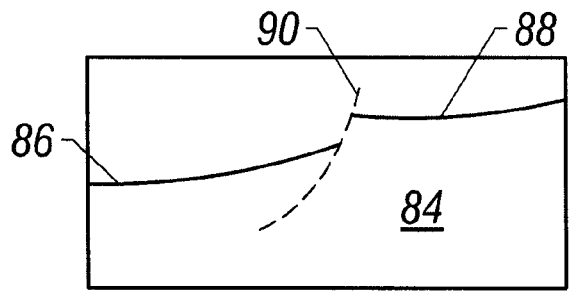

For example, as shown in FIG. 10a, if an earth model 82 initially comprising a volume 84 and two horizons 86 and 88 has inserted into it a fault 90, shown in FIG. 10b, the classification proceeds as follows.

Figure 10C:
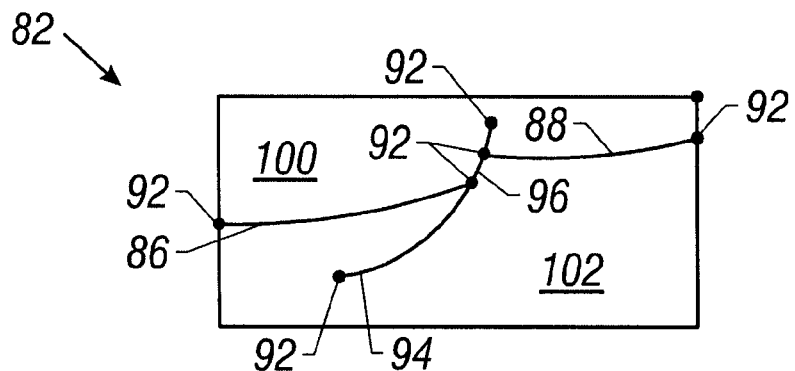
Figure 11A:
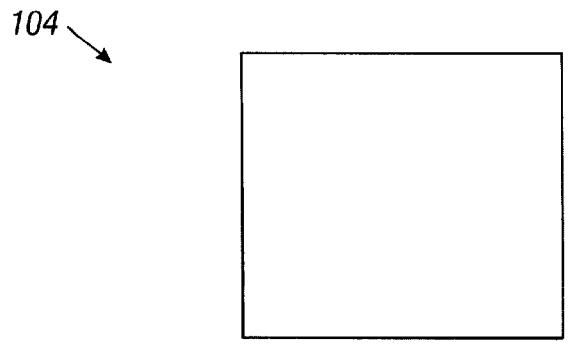
FIGS. 11a–11d illustrate the need for coherent models to perform editing.
Figure 11B:
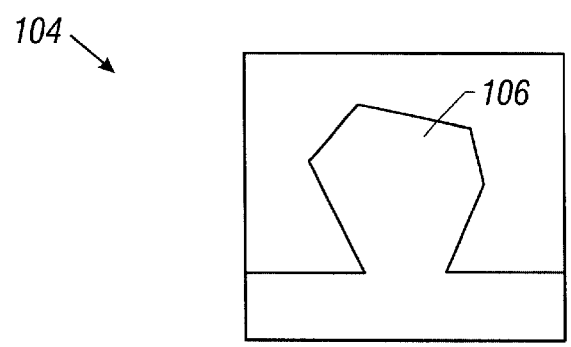
Figure 11C:
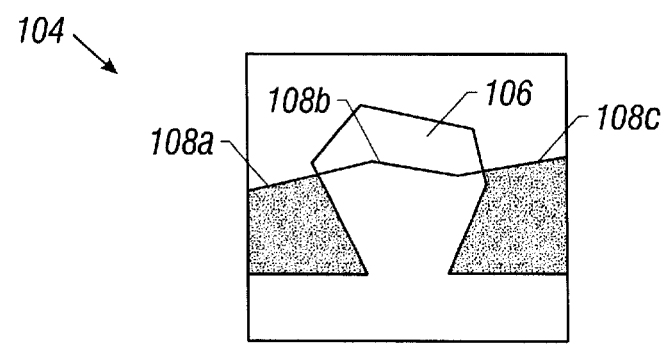
Figure 11D:
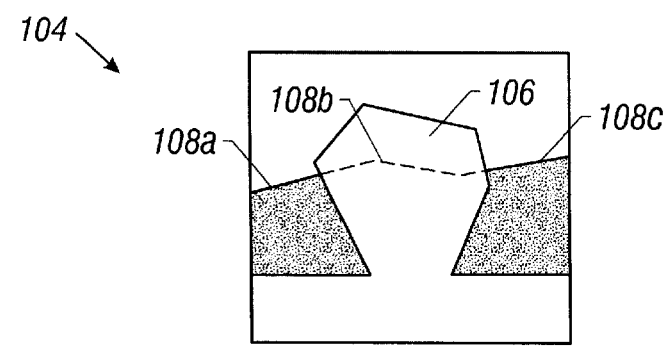

Compute the intersections of shapes and generate cells representing the intersection geometries. In FIG. 10c, the intersection geometry is represented by the heavy dot intersection points 92.

Split cells are sub-divided by lower-dimensional cells. In FIG. 10c the horizons 86 and 88 intersect fault 90. The fault 90 ceases to exist and is replaced by cells 94, 96 and 98. Similarly, the combination of horizons 86 and 88 and cell 96 splits area 84 in two. Thus, area 84 ceases to exist and is replaced by areas 100 and 102.

Classification is a macro-topological operation which is implemented using micro-topological functionality. All surfaces that provide micro-topology must be able to support the micro-topological interface required by the macro-topological interface to perform classification.

"Coherency" occurs if the geometry of the cells agrees in all dimensions. The need for coherency is illustrated, for example, in FIG. 11a–d, where a volume of interest 104 is classified with a saltdome 106 and classified with a horizon 108a–c. That part of the horizon 108b which is interior to the saltdome and geologically would not be present is then removed.

To remove the interior surface 108b requires breaking up the horizon into two components, an exterior part 108a, 108c and an interior part 108b. To do this requires two distinct geometrical parts, the interior part and the exterior part. Once the geometry has been identified it is then a matter of removing the geometry and recomputing the macro-topology. This operation can be performed if the model is coherent.

An ISP is coherent if the geometry of the cells agrees at all dimensions (i.e., if it is a homogenous simplicial complex, as defined above). Effectively, this means the 0-cell 0-simplices and 1-cell 1-simplices are faces of the 2-cell 2-simplices.

Figure 12A:
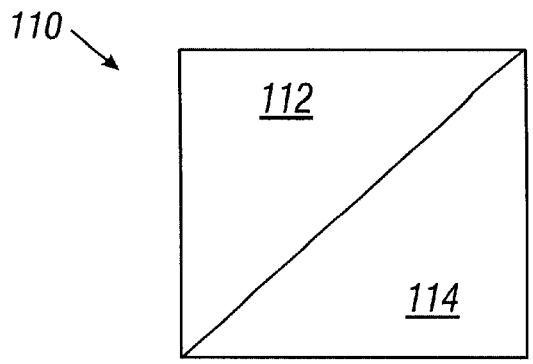
FIGS. 12a–12c illustrate making a model coherent.
Figure 12B:
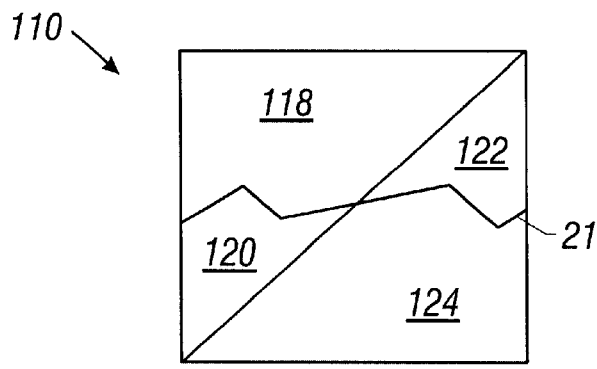
Figure 12C:
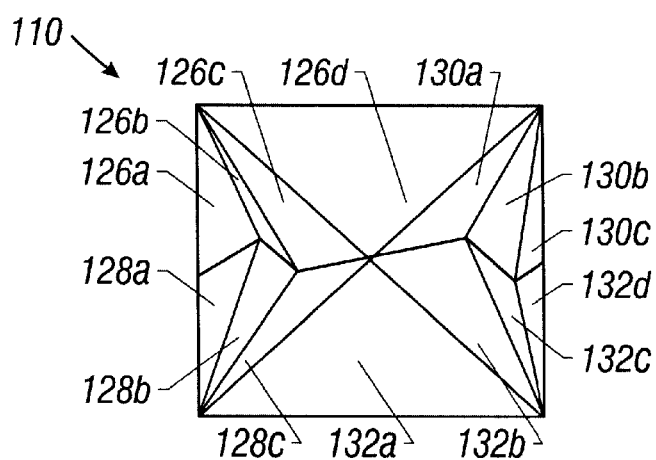

Returning to FIGS. 11a–d, to enable the removal of the interior surface 108b requires a geometrical representation of the surfaces which is coherent. In FIGS. 12a–c, a cross-sectional view of an example of classification followed by coherency is given. A cell 110 consists of two simplices 112, 114, as shown in FIG. 12a. Cells 112 and 114 are coherent because their geometry agrees at all dimensions. Volume 110 is coherent. Cell 110 is classified against surface 116 which results in two new cells, cell a={118, 122} and cell b={120, 124}. Cells a and b are not coherent because their boundaries are not faces of simplices.

To correct this, simplices 118, 120, 122, and 124 are split to respect the boundaries of cells a and b, into simplices 126a–d, 128a–c, 130a–c and 132a–d, respectively. This makes cells a and d coherent.

There are two stages to making a model coherent. The first requires a retessellation of the surface in the neighborhood of the intersection curves in order to ensure the model is coherent. The second is to perform a migration, which involves collecting together the simplices into connected components or cells and identifying each connected component with an appropriate cell in the ISP.

The retessellation can introduce tolerancing issues, because in performing the retessellation it is possible that degenerate triangles are produced. For example, a degenerate triangle may have a poor aspect ratio, or perhaps a small area. It is the responsibility of the underlying geometry engine to handle the degenerate triangles, which is typically done by merging degenerate triangles into neighboring non-degenerate triangles.

In the GQI, it is necessary for the surface representation to be "parameterized". This means each surface has an "image space" and a "domain space". The image space has to be the same for all surfaces and is typically three-dimensional Euclidean space. The domain space for a surface is typically a rectangle in the plane and as classification proceeds the domain is restricted to subsets of the rectangle.

There are two discrete surface representations which are of interest, grid and mesh. In any surface representation there are two important aspects, the topology and the geometry. Topology is used in its generic sense and refers to how the surface is connected, for example, which triangles connect to which triangles. The geometry specifies the actual position of the surface. The primary distinction between grid and mesh is grid represents topology implicitly, mesh represents topology explicitly.

There are several types of grid. They share a common feature which is that topology is represented implicitly. They differ in how the geometry is represented. The topology is represented implicitly as two integer extents giving the number of grid cells in each direction.

Figure 13A:
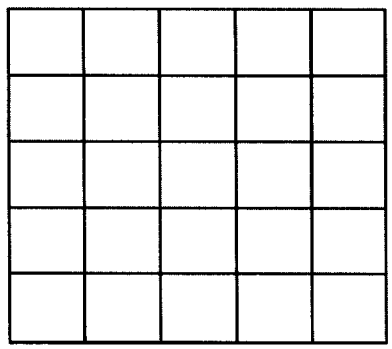
FIGS. 13a–13c illustrate grid representations.

The most compact form of grid is a "regular grid", as illustrated in FIG. 13a. For a regular grid it is only necessary to store an origin, step values for the grid points, the number of grid points and the height values for each grid point. A regular grid has a number of drawbacks. In particular, all of the grid cells are of fixed size and only height fields can be represented.

Figure 13B:
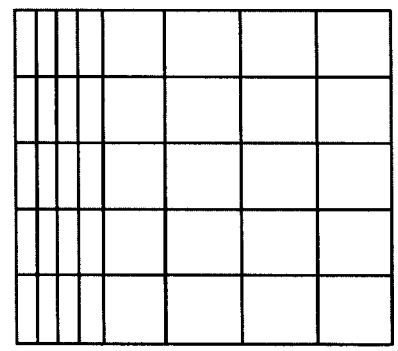

A slightly more general form of grid is a "rectilinear grid". For a rectilinear grid the grid cell sizes can vary along each axis, as illustrated in FIG. 13b. As with regular grids, however, only height fields can be represented.

Figure 13C:
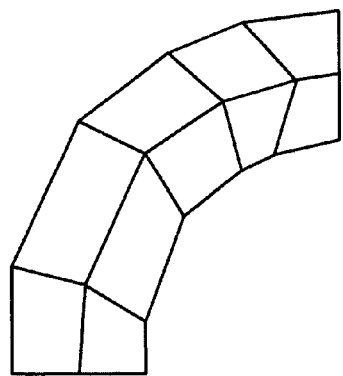

The most general type of grid is a "structured grid", as illustrated in FIG. 13c. As with regular and rectilinear grids, the topology is represented implicitly by two integer extents giving the number of grid cells in each direction. The geometry is represented explicitly by maintaining a three dimensional point coordinate for each grid point. A structured grid differs from regular and rectilinear grids because it is possible to represent multi-valued height fields. It is also more adaptive than regular and rectilinear grids allowing the grid cell size to vary across the whole grid.

Structured grids have the following characteristics: (1) they are compact; (2) they can represent multi-valued height fields; (3) topology is represented implicitly in that grid cell neighbors are given by increments and decrements of an indexing function; (4) the grid index is a natural parameterization; and (5) they are difficult to edit.

The major drawback of all grid representations is the inability to topologically edit the grid. For example, it is easy to move a vertex in a structured grid by replacing the coordinates. It is difficult to insert a new vertex into the grid, which would require regenerating the grid indices for the surface.

Figure 14:
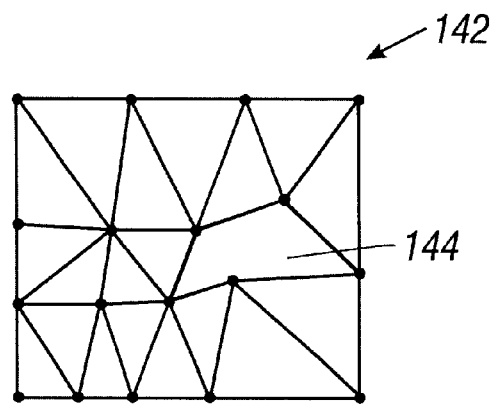
FIG. 14 illustrates a mesh representation of a surface.

The greatest advantage of a mesh representation is the ability to represent irregular geometries. A mesh 142 with an irregular hole 144 can be represented very simply, as shown in FIG. 14. Where a surface is rapidly changing the mesh can be very fine, and in large flat regions the mesh can be very coarse. It is also very easy to edit a mesh. For example, if a new vertex needs to be inserted, it is possible to retriangulate the surface in the neighborhood of the vertex.

Mesh has the following characteristics: (1) triangles are of variable size; (2) they can represent multi-valued height fields; (3) topology is represented explicitly; (4) locally editable, for example refinement and coarsening; (5) not necessarily parameterized.

Meshes can represent more general surfaces than grids. Compared to a grid, however, a mesh incurs a memory and performance cost because the topology has to be represented explicitly. However, because a mesh is irregular it can easily model multi-valued surfaces and surfaces which are rapidly changing in one area and flat in another.

When creating any surface representation, the sampling size can have a profound effect on memory usage. For example, if the sampling along each axis of a grid is doubled, the memory usage will be quadrupled. This suggests the need to selectively load portions of the model in core memory.

Furthermore, it is easy to build a geometric model which can reside in core memory, but which overwhelms even the most powerful graphics hardware. This suggests the need to be able to decimate or subsample the surfaces in an efficient manner for rendering.

Consider the following scenario. A geologist wants to create and edit on a workstation a 3D geometric model made up of meshes containing on the order of 250,000 simplices per surface and to have on the order of 50 surfaces. FIG. 15 records the rendering time in seconds on an SGI INDIGO$^2$ EXTREME with a GU1-Extreme graphics card and 128 Mbytes core memory for a set of N×N rectangular grids for a range of N. Each N×N grid contains $2(N-1)^2$ simplices. A grid's nodes are evenly spaced in two dimensions, e.g. x and y axes, but not in the third dimension, e.g. z. An optimization tool by Open Inventor (ivfix) was used to optimize the output.

In this example, the rendering rate varies with grid size, but is roughly 200,000 simplices per second. For good interactive response, rendering times on the order of 0.1 second are required, because a geologist-user wants to be able to travel interactively around the model. In the example of an SGI INDIGO$^2$ EXTREME, this speed is achieved for a 160×160 grid. In general, this figure will be highly dependent on the particular graphics hardware installed on a particular machine.

Increasing the power of the graphics hardware can significantly improve the rendering performance, but even this is of limited utility. Imagine a window on a computer of 500×500 pixels and hardware that is capable of rendering 50,000 triangles in 0.1 seconds. The total number of pixels is 250,000 that gives an average area of 5 pixels for each triangle. If the power of the rendering hardware is increased five-fold, a triangle will have an average area of 1 pixel. Beyond this point, increasing the power of the graphics hardware, and hence permitting more triangles to be rendered, will not significantly improve the quality of the screen image.

Real world surfaces are typically non-uniform. In one region a surface may be varying rapidly, in another it may be almost flat. This suggests the need for allowing the user to selectively choose different levels of detail in different regions of the model.

A geologist uses a 3D geometrical representation much like a microscope, in the sense that she wants to zoom in and zoom out in relatively small regions in a controlled manner. This usage is similar to that supported by terrain visualization implementations.

For visualization it would beneficial to draw parts of the model in the far field of view in a coarse representation, the parts of the model in the near field of view in detail.

After classification and coherency procedures have been performned, a valid ISP has been built. Typically, the model is too detailed to be viewed interactively on hardware that exists at present so the amount of detail from the model is reduced or "decimated". To avoid unnecessary artifacts in the model it is important that the decimated model respect the topology of the underlying ISP, as discussed above. This means all features of the boundary representation must be represented. The two effects that must be avoided are cracking and bubbling as discussed below.

There are two basic changes that can happen in the topology of a model. These two changes can happen in two places in the topology, the first is within a surface itself, the second in the boundary representation.

Cracking is often seen as a hole where there was no hole before, as shown in FIGS. 16a–c. Two approximations are shown of a half-cylinder 146, shown in FIG. 16a. The first approximation 148, illustrated in FIG. 16b, exhibits a hole 150 in the surface, while the second approximation 152, shown in FIG. 16c, does not.

Cracking can also occur in the boundary representation of the ISP, as shown in FIGS. 17a–b. An ISP 154, shown in FIG. 17a, has an intersection curve 156 splitting a surface into two cells 158 and 160. When the ISP is decimated as shown in FIG. 17b (with cell 158 being approximated, but cell 160 not being approximated), the intersection curve on cell 158 has been approximated by a straight line 162, the intersection curve on cell 160 has not been approximated. Due to the different approximations, the boundaries of cells 158 and 160 are no longer coincident and a hole 164 appears.

Bubbling is where intersections occur where there were none before decimation. As with cracking this can occur within the surface and within the boundary representation. Bubbling within a surface can occur where a non-self-intersecting surface becomes self intersecting, as shown in FIG. 18a–b. In FIG. 18a, a cross-sectional view is given of a surface 166. Vertex 168 is dropped which causes the surface to become self-intersecting at point 170, as shown in FIG. 18b, introducing a bubble 172.

Bubbling can occur in a similar fashion to the cracking that occurred in FIGS. 17a–b, as shown in FIGS. 19a–b. FIG. 19a shows a cross-section of an ISP 174 comprising of two surfaces 176 and 178. In a decimated version of the ISP 180, shown in FIG. 19b, surface 176 is decimated by dropping vertex 182, while surface 178 remains unchanged. This introduces new intersections 184 and 186 between surfaces 176 and 178 that did not intersect in the original ISP 174, producing bubble 188.

A new hierarchical surface representation is able to represent a surface that is initially imported as a structured grid and is then edited by the use of classification and coherency. The representation supports the micro-topological interface required by the SHAPES geometry engine for a surface to be used in classification. The surface also supports adaptive decimation algorithms that prevent cracking and bubbling. The architecture is a hybrid-grid mesh. This means wherever possible a grid is used, but, when necessary, mesh regions overlaying the grid are used. This has many advantages, for example, being able to tune algorithms to make use of a grid representation when the surface is a grid. But, when greater flexibility is required, the grid representation can be exchanged for a mesh representation.

Typically, surfaces are imported as grids. However, the geometry engine can only perform geometric calculations with mesh. The hybrid grid-mesh representation neatly solves this problem, because areas of the grid can be dynamically converted to mesh thereby supporting general topological and geometrical editing. But, the efficient grid representation can be used where such general editing is not required. Effectively, the underlying geometry engine is fooled into believing the surface is a mesh. Furthermore, since it is possible to identify which areas are grid and which are mesh, algorithms can be optimized to make use of the grid structure whenever possible. An example of tuning when the surface is a grid is encoding the particular triangulation of the grid. A grid cell has two possible triangulations 190 and 192, as shown in FIGS. 20a–b.

The triangulation of the grid can be stored in a bit vector, each bit representing the chosen triangulation of a particular grid cell. In this way it is not necessary to maintain the triangulation of the grid explicitly as simplices.

In general, the grid can be thought of as being the background and the mesh the foreground. Since the surface maintains its grid representation in the background it is possible to discard the mesh foreground at any time and recover the grid background. At any time a portion of the grid can be turned to mesh by reading the triangulation bit-vector and dynamically building simplices.

The hybrid architecture maintains the flexibility to provide the irregular refinement of a grid. This is important, for irregular refinement is required for efficient classification and coherency algorithms.

For the purposes of the implementation, a quadtree has been used to provide a multiresolution hierarchy. A quadtree was chosen because of its geometrical relationship to sub-sampling in grids.

Figure 21:
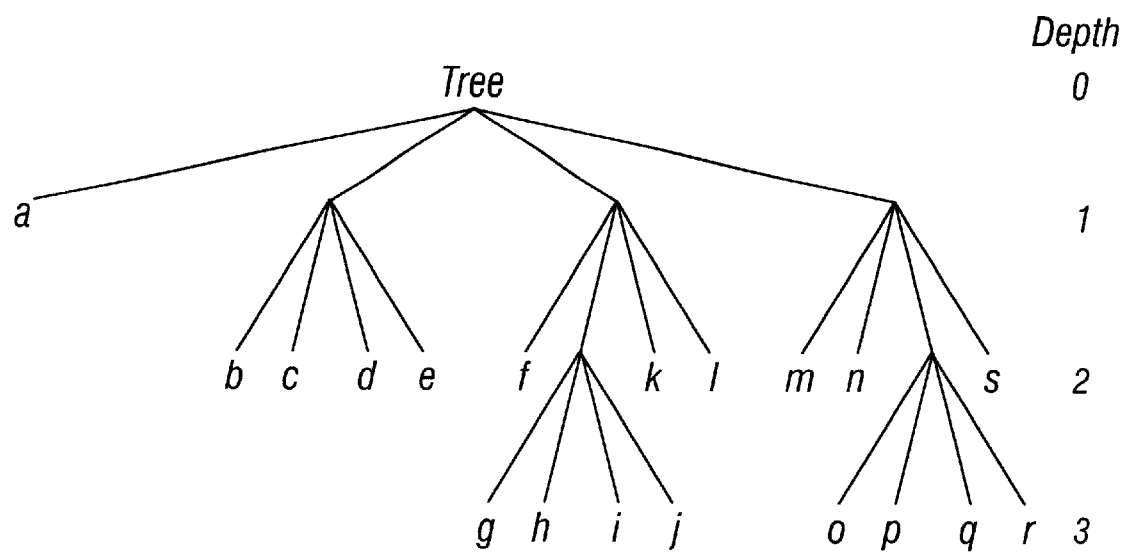
FIG. 21 is a graphical representation of a quadtree.
Figure 22:
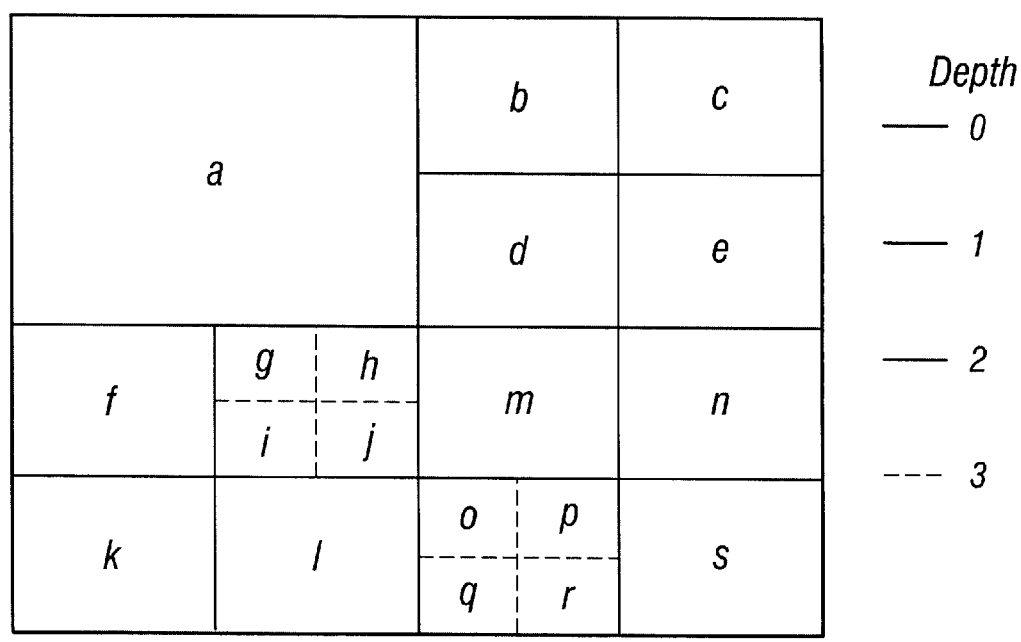
FIG. 22 is a geometrical representation of a quadtree.

A quadtree is a tree with nodes, each of which has four children, except for the leaf nodes, which have no children. Any quadtree can be drawn graphically, as shown in FIG. 21, or geometrically, as shown in FIG. 22. Every node of the tree has a unique depth and can be assigned a unique key.

The key of a quadtree node is chosen to provide the following functionality.

A compact and efficient way to dereference quadtree nodes.

A linear ordering for the quadtree nodes.

An efficient way to compute the depth of the key.

An efficient way to compute whether a key is an ancestor of another key.

An efficient way to compute whether a key is a descendant of another key.

A way to compute the ancestor keys of a key.

A way to compute the descendant keys of a key.

Efficient in this context means a small number (typically <5) of bitwise Booleans together with bit shifts and arithmetic operations. The implementation of the quadtree key can be done by using pairs of bits to hierarchically identify the child at each level and representing the depth as an integer. Let ceil(x) be the smallest integer greater than or equal to x. Using the implementation of the quadtree key described above, the number of bits required to represent a tree of depth d is given by $2d+\text{ceil}(\log_2(d+1))$, where the factor $2d$ is the mantissa (2 bits are required to identify each child at each depth), and the factor $\text{ceil}(\log_2(d+1))$ is the number of bits required to represent the integer value d. Thus a 32 bit key can represent a tree of depth 14, and as shall be seen this is more than adequate for current needs.

The mantissa is implemented using bit interleaving.

In FIG. 23 the size of the different components of a quadtree are given for different depths of the quadtree. It can be seen a tree of depth 10 can support a grid of size 1000 by 1000, furthermore, the key is comfortably maintained in 32 bits.

The following definitions will be used:

The number of elements (cardinality) in a collection C will be denoted by Card(C).

The key of a quadtree node N will be denoted by Key(N).

The quadtree node of a key K will be denoted by Node(K).

The depth of the key K will be denoted by Depth(K). Without loss of generality, the root key has depth 0.

The ancestor key at depth i of the key K will be denoted by Ancestor$_i$(K). The function is defined for i≦Depth (K) with Ancestor$_{Depth(K)}$(K)=K.

Denote by Ancestors$_i$(C) the collection of ancestor keys of the collection of keys C:

$$Ancestors_i(C) = \bigcup_{K \in C} Ancestor_i(K)$$

Note there is a one-to-one correspondence between nodes and keys:

Node(Key(N))=N, Key(Node(K))=K

For simplicity, and since the original surface is a structured grid, the quadtree leaf nodes are assumed to be all at the same fixed depth. It is possible for branches of the quadtree to be empty. To ensure unnecessary navigation across empty parts of the tree, if a node is present in the tree it must have a non-empty leaf node in its descendants.

Conceptually, all surfaces are represented as mesh. However, it is not necessary for the mesh to be completely built, in fact, it is possible to dynamically build the mesh as and when required provided sufficient topology is maintained to support geometrical and topological algorithms. Once an area of the surface is marked as mesh and simplices have been built for this region, more general, topological editing can be performed in this region, for example, refinement.

Following this paradigm, simplices are conceptually assigned to quadtree leaf nodes in a regular manner. As discussed above, this can be easily done for a grid. The quadtree leaf node maintains a flag that signifies whether its simplices have been built or not. If asked for its list of simplices the leaf node can return the list of simplices if they have been built, or build them dynamically and return the list. In this way a simplex is assigned to a unique quadtree leaf node.

The geometrical representation of a quadtree mirrors the regular structure of a grid and hence it is natural to assign each grid cell in a regular manner to a unique quadtree leaf node. For example, the geometric tiling of a quadtree described above can be used and the grid cell may be assigned to the quadtree leaf node that contains its lower left corner. When a grid cell is triangulated, it contains a pair of simplices. These simplices are assigned to the quadtree leaf node of their grid cell.

The quadtree leaf node that contains the simplex S will be denoted by Leaf(S).

Having made the assignment of simplices to quadtree leaf nodes, the quadtree hierarchy gives an equivalence relation for each depth i of the quadtree, by assigning simplices to their ancestor node at level i.

If S and S' are simplices then S~S'→Ancestor$_i$(Leaf(S))=Ancestor$_i$(Leaf(S'))

In other words, each quadtree node is assigned the simplices of its descendants and we define for a quadtree node:

Simps(N)={S|S∈N}

As has been explained, each quadtree node has been assigned a collection of simplices. The quadtree node inherits a boundary from its collection of simplices, i.e., the boundary of the simplices. This boundary is a list of vertices and edges connecting the vertices. Furthermore, at a fixed depth in the tree, the boundaries of all the quadtree nodes at the chosen depth form a graph.

The graph of the boundaries of the quadtree node will be a particularly detailed object for it takes its edges from the simplices in the full-resolution surface. It would be preferable to approximate the boundary of the quadtree node with a reduced set of edges and hence a reduced set of vertices. For example, as shown in FIG. 24a, it can be seen that vertex 194 can be dropped and the edge 196 which it defines. The edge can be straightened, as shown in FIG. 24b, without changing the basic structure of the graph (more precisely, the topology of the graph has not changed).

In contrast, if vertex 198, shown in FIG. 25a, is collapsed to vertex 200, the valence of vertex 200 changes from three to four and hence the topology of the graph is modified. It can be seen that the only vertices which can be dropped and still preserve the topology of the graph are the vertices of valence two (such as vertex 194 in FIG. 24a). This can be made precise by introducing the notions of homeomorphic graphs. Graphs are well-known topological objects in mathematics and many techniques have been developed to study them.

From the description above, there is a collection of vertices that cannot be removed without changing the topology of the graph. These vertices are of interest as they encode the topology of the surface. However, it can be difficult to compute this collection of vertices. The following discussion describes a computationally cheap means to find a collection of vertices, called "critical vertices", which include the vertices described above.

The critical vertices are the crucial component when describing the topology of the surface. They enable navigation to be performed within the tree without requiring the complete tree to be loaded in memory. Moreover, they avoid creating unnecessary mesh regions to describe the geometry of the surface. The navigation is generally an important part of a surface description but is essential in the operation of making coherent.

The critical vertices are also crucial in the decimation stage because they are the vertices that will appear in the decimated model.

There are two classes of critical vertices: "internal" critical vertices and "external" critical vertices. The internal critical vertices are present to provide topological connectivity in the interior of the surface. The external critical vertices provide topological connectivity around the boundary of the surface and along cracks in the surface.

Again, the driving example is the sub-sampling of a regular grid. The critical vertices mirror sub-sampling in a regular grid.

Figure 26:
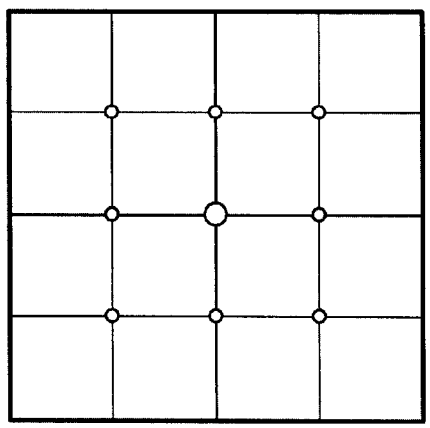
FIG. 26 illustrates internal critical vertices.

A vertex is an internal critical vertex if the vertex is in the interior of the surface and it can not be removed from the graph of edges without changing the topology of the graph. A vertex is critical at depth i if it is at the intersection of three or more quadtree nodes at depth i. For the regular partition of a grid, the critical vertices are the interior vertices of the sub-sampled grid, as can be seen in FIG. 26.

The internal critical vertices do not include the boundary vertices. To include these requires the macro-topology of the 2-cell to be used and gives the notion of an external critical vertex.

A vertex is an external critical vertex at depth i if it is:
A vertex which is identified with a 0-cell.
A vertex which is identified with a 1-cell vertex and lies at the boundary of two or more quadtree nodes at depth i.

Figure 27:
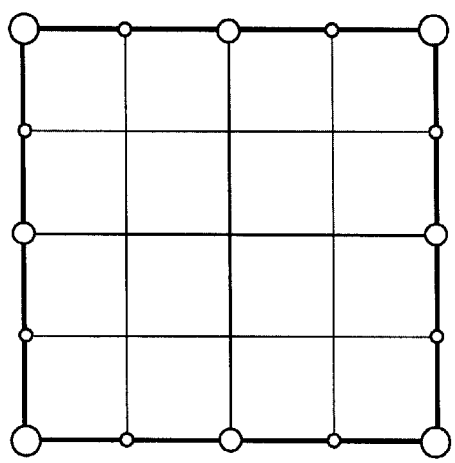
FIG. 27 illustrates external critical vertices.

The external critical vertices permit the boundaries to be included, as can be seen in FIG. 27.

The collection of critical vertices is the union of the internal critical vertices and the external critical vertices. One can see from the definitions if a vertex, v, is critical at depth d then the vertex is critical at all depths greater than d.

Figure 28A:
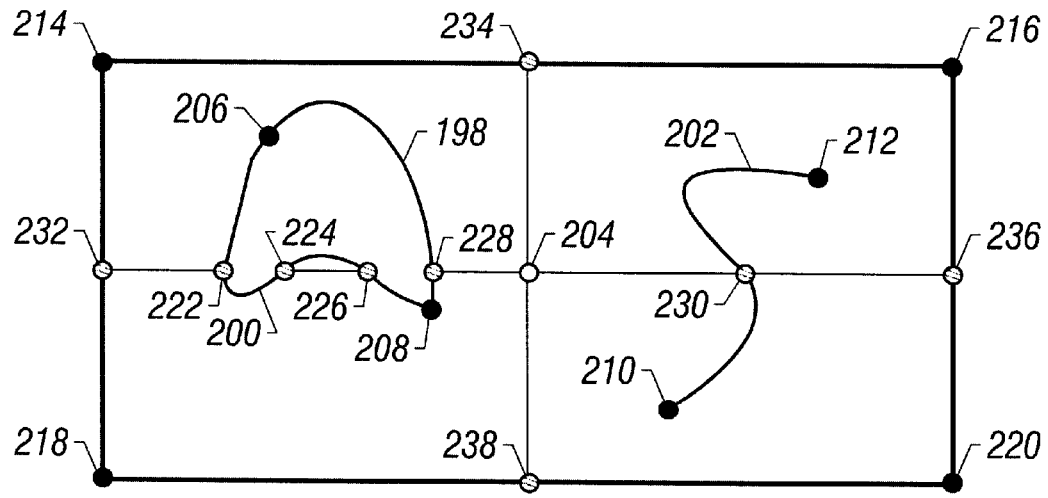
FIGS. 28a–b, 29a–b illustrate approximation of a surface while respecting critical vertices.
Figure 28B:
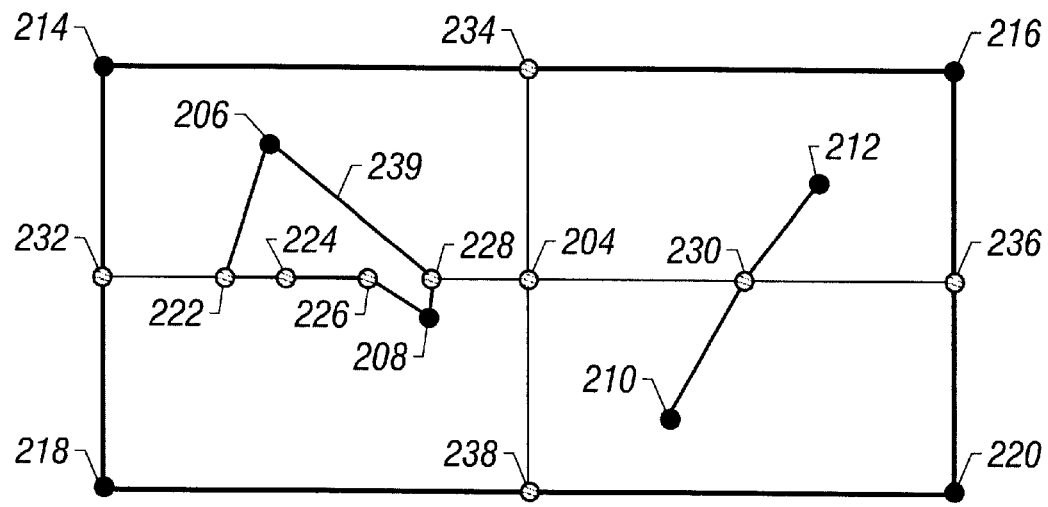

The "depth" of a critical vertex is the depth at which the vertex first becomes critical. If a vertex is never critical in the tree, it will first appear in the vertices of the simplices of a leaf node and its depth is given by the depth of the tree plus 1. The critical vertices represent an approximation of the surface and at greater depths of the quadtree the approximation improves. FIG. 28a shows an original surface with a hole comprising two 1-cells 198 and 200 and a crack comprising one 1-cell 202 with a quadtree overlaid. At this depth, there is only internal critical vertex 204 (occurring at the intersection of three of more quadtree nodes). There are external critical vertices 206, 208, 210, 212, 214, 216, 218, and 220 identified with a 0-cell. There are 9 external critical vertices 222, 224, 226, 228, 230, 232, 234, 236 and 238 identified with a 1-cell vertex of the surfaces and lying at the boundary of two or more quadtree nodes. FIG. 28b shows the approximation of the surface, hole and crack at this level of decimation. Curves between critical vertices are replaced by straight lines. For example, the portion of curve 198 between critical vertex 206 and critical vertex 228 is replaced by line 239.

Figure 29A:
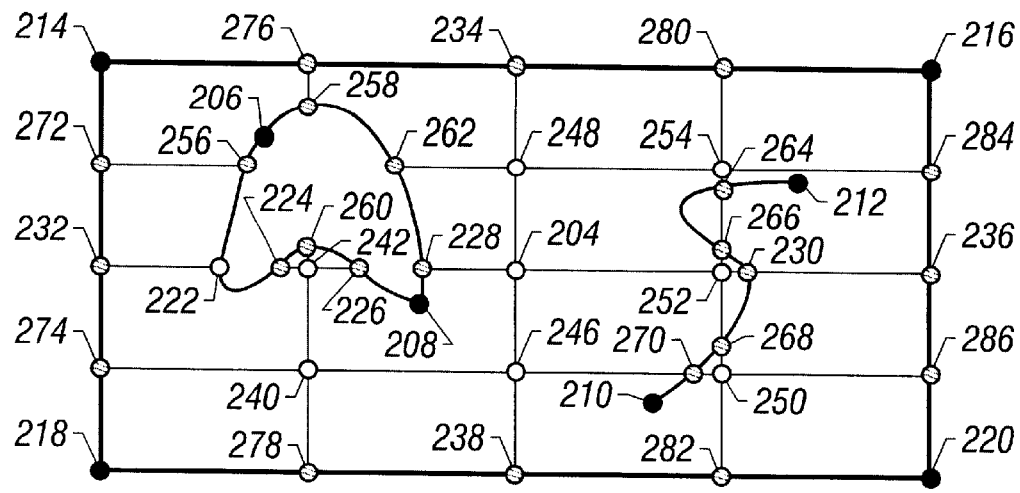
Figure 29B:
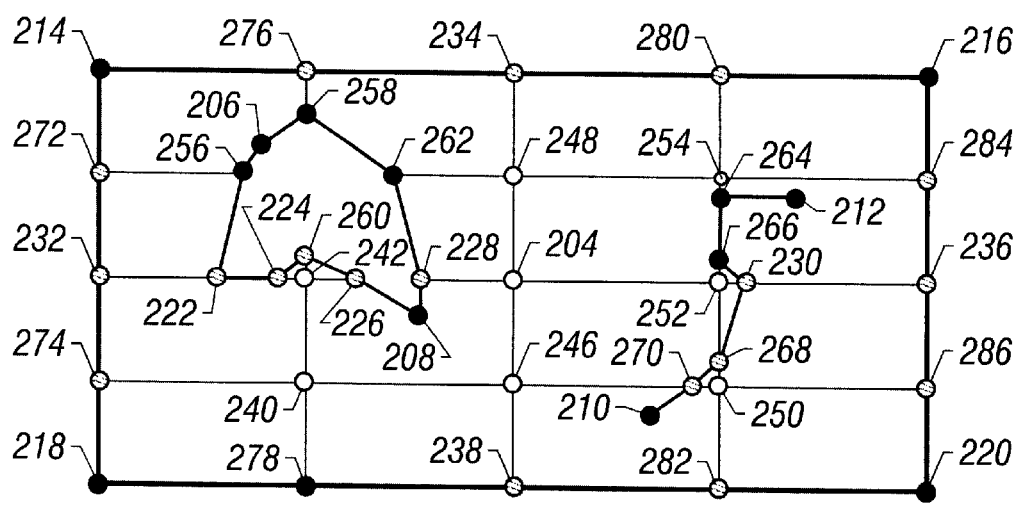

FIG. 29a shows the same original surface overlaid with a quadtree at a depth one greater than that shown in FIG. 28a. The number of quadtree nodes quadruples from four to sixteen. Consequently, seven interior critical nodes 240, 242, 246, 248, 250, 252 and 254 are added. Further, 1-cell external critical vertices at the boundary of two or more quadtree nodes 256, 258, 260, 262, 264, 266, 268, 270, 272, 274, 276, 278, 280, 282, 284 and 286 are added. FIG. 29b shows the approximation of the surface, hole and crack at this level of decimation. Again, curves between critical vertices are replaced by straight lines.

As can be seen, assigning critical vertices to a quadtree node allows a decimated view of a surface to be built. For the quadtree node, N, let CriticalVerts(N)={|v|v∈Verts(S) for some S∈Simps(N) and depth(v)≦depth(Key(N))}

In its most abstract form, a 2-simplex is formed from three vertices. In a mesh, the connectivity of the surface can be represented by sharing the same vertex across different simplices and maintaining within a vertex references to the simplices which reference the vertex. So, given a simplex, one can navigate to one of its vertices and from the vertex can navigate back to another simplex. In this manner one can travel around the simplices and vertices in a surface.

In the hierarchical surface representation, connectivity is built in a different manner. Within each critical vertex, instead of storing the simplices which reference the vertex, the keys of the quadtree leaf nodes which have the vertex as a critical vertex are stored. This list of keys is called the vertex descriptor. In this manner, it is not necessary to instantiate simplices to be able to navigate around the surface. Navigation can be performed from a quadtree node by using the quadtree leaf keys from the vertex descriptor of one of its critical vertices to navigate to an ancestor node of the key.

More precisely, each simplex belongs to a unique quadtree leaf node and the simplex is conceptually assigned the key of this leaf node. In the mesh representation of the surface, a vertex is shared by a list of simplices (these simplices may not be instantiated). Thus, the vertex inherits a list of leaf keys from the keys assigned to the simplices that reference the vertex. This list, which is the vertex descriptor, is defined for all vertices in the surface and for the critical vertices is the same list as the one described in the paragraph above.

It is not necessary to store the quadtree leaf key in a simplex because it can be computed from the vertex descriptors of the simplice's vertices, as described below. However, for efficiency, it can be cached at the simplex.

Within a cell, denote by Simps(v) the set of simplices that connect to the vertex v. Denote by Verts(S) the set of vertices forming the corners of the simplex S. The "vertex descriptor" for the vertex v, is the list of leaf keys of the simplices connected to the vertex, v, $$Keys(v) = \bigcup_{S \in Simps(v)} Key(Leaf(S))$$

For performance, the tree is chosen such that the following condition is met:

Card(Keys(v))≦4

By assigning the vertex descriptors to the vertices, it is possible to indirectly determine the leaf key of a simplex by $$Key(Leaf(S)) = \bigcap_{v \in Verts(S)} Keys(v)$$

Having assigned the vertex descriptors to the vertices it is now a cheap operation to determine the criticality of a vertex at a particular depth of the tree.

Let dim (v)=macro-dimension(v). That is, let $$dim(v) = \begin{cases} 0, & \text{if } v \text{ is identified with a 0-}cell\ vertex \\ 1, & \text{if } v \text{ is identified with a 1-}cell\ vertex \text{ and no 0-}cell\ vertex \\ 2, & \text{if } v \text{ is not identified with a 1-}cell \text{ or 0-}cell\ vertex \end{cases}$$

Let $k_i(v)$ be the number of ancestor keys at depth i of the vertex v, $k_i(v)$=Card(Ancestors$_i$(Keys(v)))

The vertex v is critical at level i if it satisfies any of the following:
The vertex v is identified with a 0-cell vertex.
The vertex v is identified with a 1-cell vertex and the number of ancestor keys at depth i is greater than one.
The number of ancestor keys at depth i is greater than two.
Equivalently, the vertex v is critical at level i if, $k_i(v)$>dim(v)

A quadtree node inherits a collection of simplices from the leaf nodes that are its descendants. If this collection of simplices does not reference any vertices that are identified with 0-cell or 1-cell vertices then, in the preferred embodiment, it is required that the collection of simplices must be homeomorphic to a 2-disk. In particular, the node must be connected and simply-connected (i.e. not have any holes).

This requirement improves the efficiency of the algorithms, in particular migration, and saves having to perform difficult topological analysis of the quadtree nodes. As will be seen, this requirement will be satisfied for all algorithms of interest provided the initial quadtree that is built satisfies the connectivity requirement.

The data structures of the quadtree has the following characteristics:

Grid cells are assigned to quadtree leaf nodes in a regular manner, as described above.

The initial triangulation of the surface is defined by splitting grid cells. The simplices from a split grid-cell are then assigned to the quadtree leaf node to which the grid-cell was assigned.

Each quadtree leaf node maintains the list of simplices which it contains. If the simplices have not been built, this list is empty. The simplices are built dynamically from the grid cells when required. When the simplices have been built, the quadtree leaf node is marked as mesh and the grid representation can no longer be used.

Each vertex is assigned a vertex descriptor that is the list of leaf keys of the simplices that use the vertex.

Each quadtree node maintains the list of vertices that are critical for this quadtree node at the quadtree node's depth.

Each quadtree node that has no vertices identified to 1-cell or 0-cell vertices in any of its descendants is topologically connected and simply connected.

A quadtree node is "pure grid" if none of its descendant leaf nodes have been meshed.

A "mesh" vertex is a vertex for which a simplex has been built which references this vertex.

A "grid" vertex is a vertex for which no simplices that reference it have been built.

A quadtree can be implemented in two basic forms. The first is to use a look up table based on the quadtree key, which can be done by using the ordering on the quadtree keys. The second is to maintain links from the parent to the four children nodes similar to a linked list. The first implementation will be called a linear array quadtree, the second implementation a linked quadtree.

A linear array quadtree is efficient for indexing on the key, but if large portions of the tree are non-existent it can be wasteful of memory. The linked quadtree is efficient where large portions of the tree are non-existent, but is inefficient for indexing on the key as it requires searching down the parent-child links.

The implementation of the quadtree uses both techniques. For the coarse depths the linear array is used and at the finer depths a linked tree is used. This provides faster indexing for coarse keys, but is not too wasteful of memory.

An iterator is provided for the tree, which maintains a key and provides efficient retrieval of the parent nodes. By using an iterator it is not necessary to maintain a key or the parent pointers in the quadtree nodes. They can be maintained in the iterator.

A bit tree is maintained which indicates whether a particular quadtree node is pure grid. This allows optimization on the basis that one knows whether a particular node is pure grid. For example, for a surface built from a regular grid, for a pure grid node, only the max z and min z values need be stored to recover a bounding box.

A bit vector for the grid cells is maintained which describes how a particular grid cell is split into simplices. This means it is not necessary to split all the grid cells to define the simplicial structure.

For grid vertices, there is no need to build their vertex descriptor, because keys can be generated on the fly for nodes that are pure grid. So vertex descriptors are only needed for mesh vertices. Furthermore, one knows a quadtree node that is pure grid has four neighbors and hence a pure grid node can be migrated easily.

The implementation of the quadtree maintains the following data structures and implements the following algorithms.

A bit vector, with one bit for each grid cell, to represent the triangulation of grid cells.

A bit tree, with one bit for each node in the quadtree, to determine if a node is present in the tree. This is necessary to determine whether a node is present in persistent storage.

A bit tree, with one bit for each node in the quadtree, to denote whether a node is pure grid or not. A node can be pure grid even though its boundary vertices may connect to mesh nodes. The bit tree is an efficient hierarchical encoding of the hybrid grid-mesh representation.

An iterator is used to navigate in the tree. Thus the nodes do not need to store parent pointers or keys.

Vertex descriptors are not needed for grid vertices.

Simplices are built only when required, e.g. to support intersection curves.

The quadtree key can be implemented in 32 bits.

Coarse levels of the tree are implemented as a linear array quadtree. Finer levels are implemented as a linked quadtree.

The mesh representation stored at the quadtree leaf nodes is the micro-topological representation defined in the SHAPES geometry engine. This is to save unnecessary conversion between different mesh representations when passing geometry to the SHAPES geometry engine. If a geometry engine had an alternate mesh representation it would be possible to use this representation instead.

The implementation of the algorithms is now discussed, beginning with classification.

At each quadtree node a bounding box is maintained which is large enough to contain all the simplices assigned to that quadtree node.

To compute the intersection of two surfaces the bounding boxes can be used in a hierarchical manner to compute the quadtree leaf nodes that intersect. At this point, intersecting quadtree leaf nodes are resolved to their individual simplices that are then intersected to determine the intersection curve.

In the preferred embodiment, the underlying geometry engine computes the correct topology when all possible intersecting triangles are passed to the engine.

The next step is to make the model coherent. Making coherent consists of two fundamental steps. The first is to split simplices that lie along the macro-topological boundaries so the simplicial structure of the surface respects the micro-topology of its bounding 1-cells and 0-cells. The second is to collect the simplices into their respective topologically connected components, which is called migration.

In overview, new quadtrees are built for each new cell. As each simplex is split, each resulting simplex is assigned to the new quadtree for the cell. Using mesh connectivity, the remainder of the simplices which lie in the quadtree leaf nodes it belongs to are migrated. The quadtree nodes that are not split are then considered. These quadtree nodes are topologically connected and a flood fill using the vertex descriptors of the already migrated vertices is used to migrate these nodes. At this point, the critical vertices of each quadtree node in each new quadtree can be recomputed as described above. Finally, the bounding boxes are recomputed for each quadtree node.

A collection of nodes, C, of the quadtree T is a "node front" if every leaf node of T either has no ancestor in C or has a unique ancestor in C (a node is an ancestor of itself).

A collection of nodes, C, of the quadtree T is a "complete node front" if C is a node front and every leaf node of T has an ancestor in C.

A subtree S of T can be built from the node front C, by taking all of the ancestors of C in T. The tree structure of S is inherited from T and the collection C forms the leaves of S.

Figure 30A:
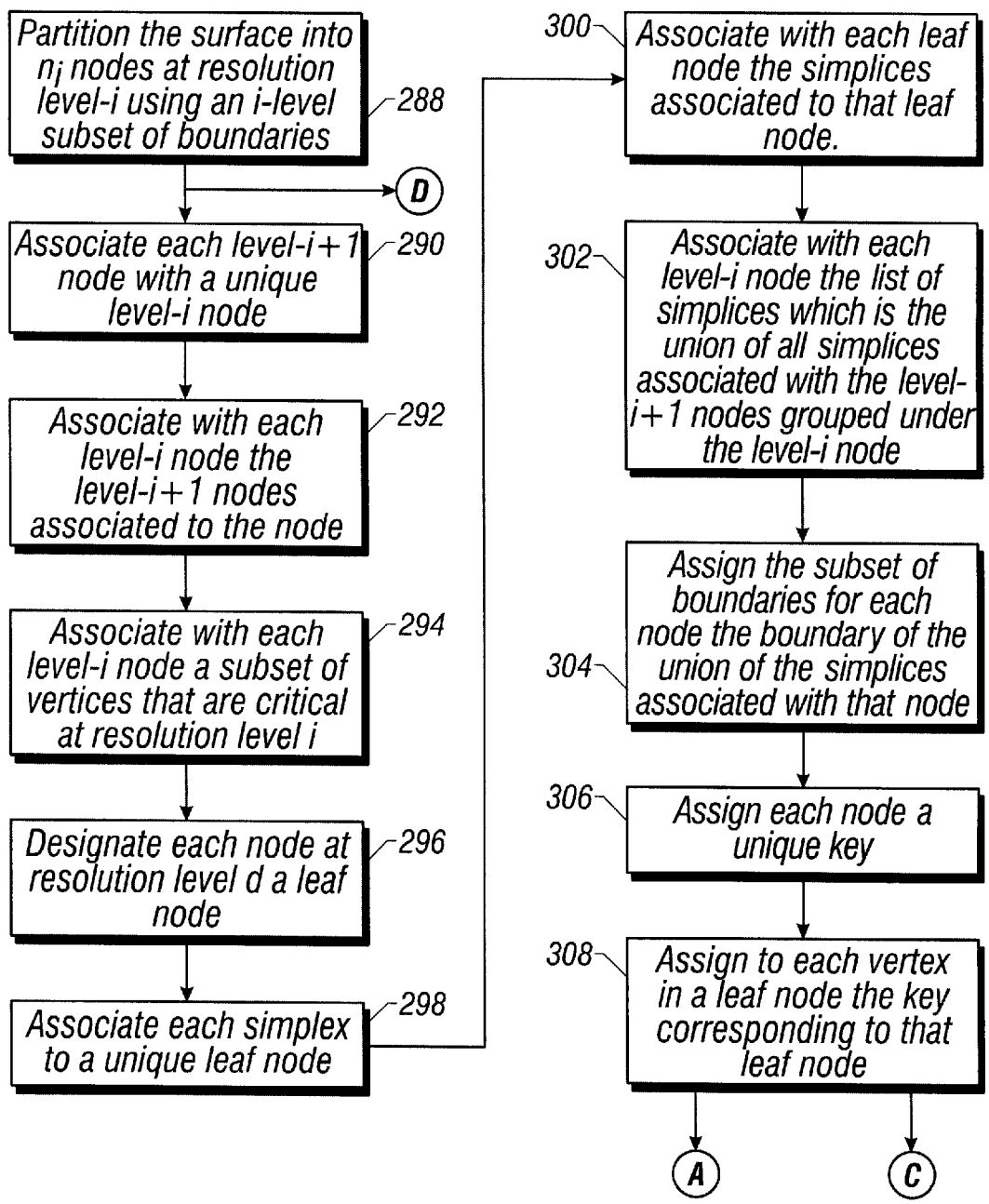
FIGS. 30a–e and 33 are flow diagrams.

The process begins with the surface being partitioned into $n_i$ nodes at resolution level-i using an i-level subset of boundaries 288, as shown in FIG. 30a. Each level-i+1 node is associated with a unique level-i node 290. Each level-i node is associated with the level-i+1 nodes associated to the node 292. Each level-i node has associated with it a subset of the vertices that are critical at resolution level i 294. Each node at resolution level d is designated a leaf node 296. While the preferred embodiment has leaf nodes at the same level, it is also possible to have leaf nodes at numerous levels of resolution.

Each simplex is associated with a unique leaf node 298. Each leaf node has associated with it the simplices associated to that leaf node 300. Each level-i node has associated with it the list of simplices which is the union of all simplices associated with the level-i+1 nodes grouped under the level-i node 302. The subset of boundaries for each node is assigned to be the boundary of the union of the simplices associated with that node 304. Each node is assigned a unique key and each vertex in a leaf node is assigned a key corresponding to that leaf node 308.

Figure 30B:
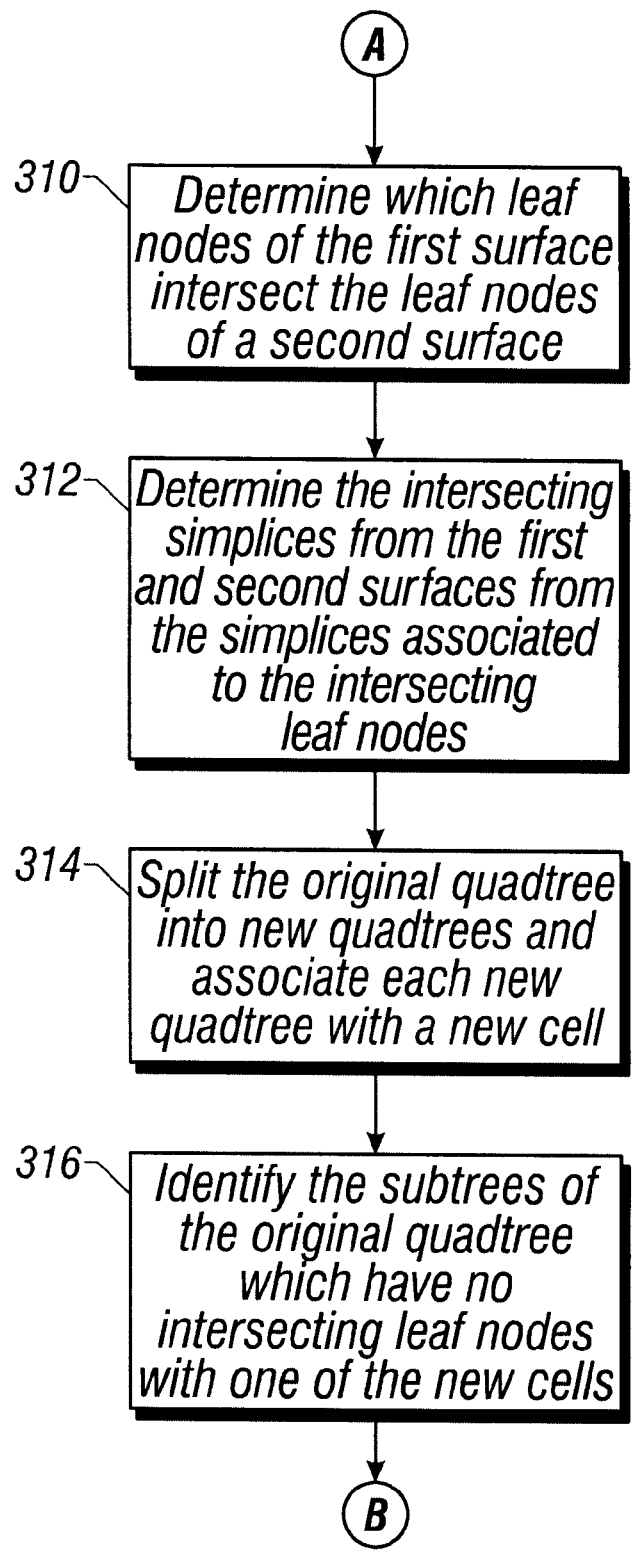

Now assume that a second surface is classified into the model. It is determined which leaf nodes of the first surface intersect the leaf nodes of the second surface 310, as shown in FIG. 30b. The intersecting simplices from the first and second surfaces are determined from the simplices associated to the intersecting leaf nodes 312. The original quadtree is split into new quadtrees and each new quadtree is associated with a new cell 314. The subtrees of the original quadtree which have no intersecting leaf nodes are identified with one of the new cells 316.

Figure 30C:
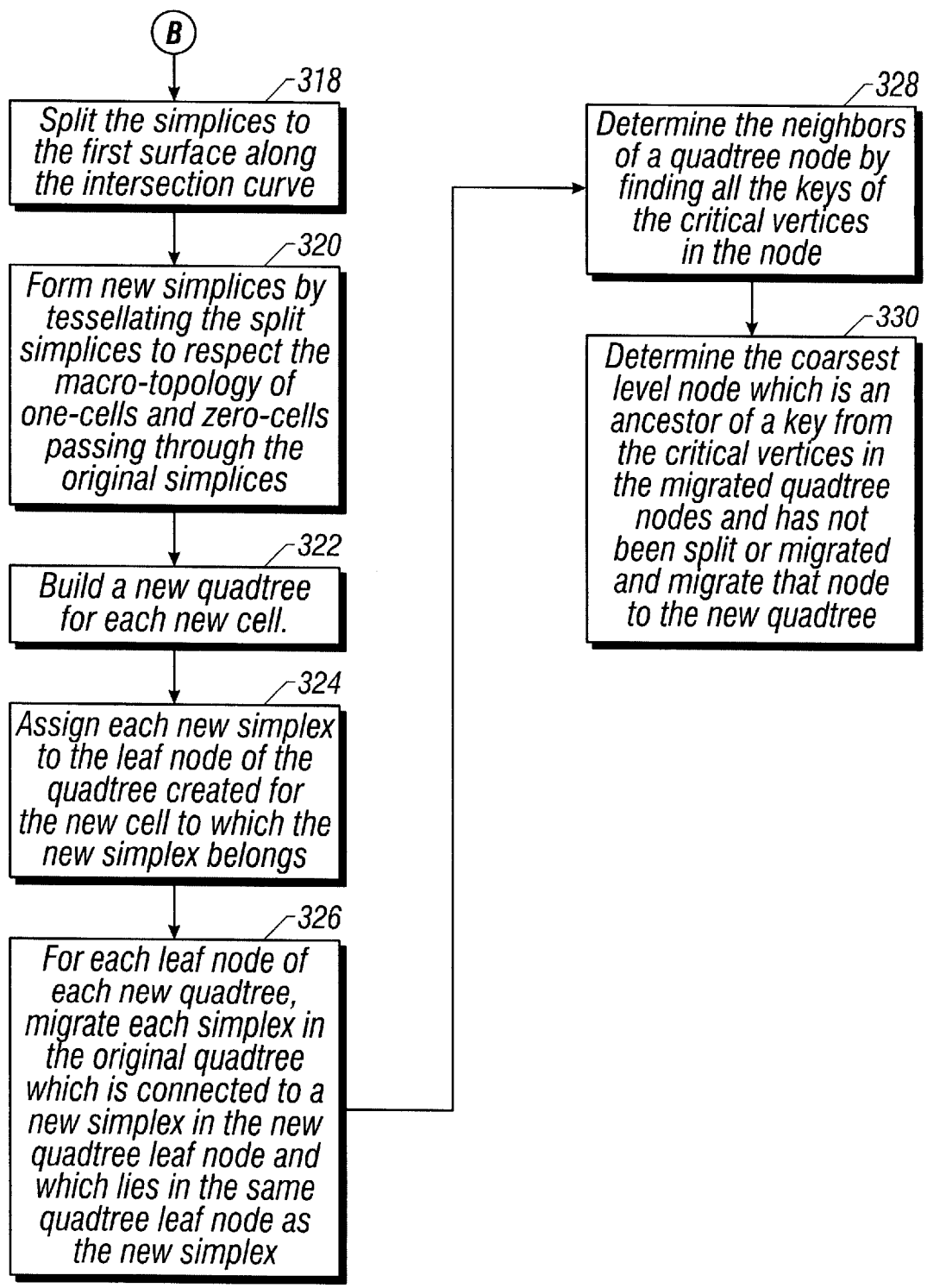

The simplices of the first surface are split along the intersection curve 318, as shown in FIG. 30c. New simplices are formed by tessellating the split simplices to respect the macro-topology of one-cells and zero-cells passing through the original simplices 320. A new quadtree is built for each new cell 322. Each new simplex is assigned to the leaf node of the quadtree created for the new cell to which the new simplex belongs 324. For each leaf node of each new quadtree, each simplex in the original quadtree which is connected to a new simplex in the new quadtree leaf node and which lies in the same quadtree leaf node as the new simplex is migrated 326. The neighbors of a quadtree node are determined by finding all the keys of the critical vertices in the node 328. The coarsest level node which is an ancestor of a key from the critical vertices in the migrated quadtree nodes and which has not been split or migrated is determined and migrated to the new quadtree 330.

Figure 30D:
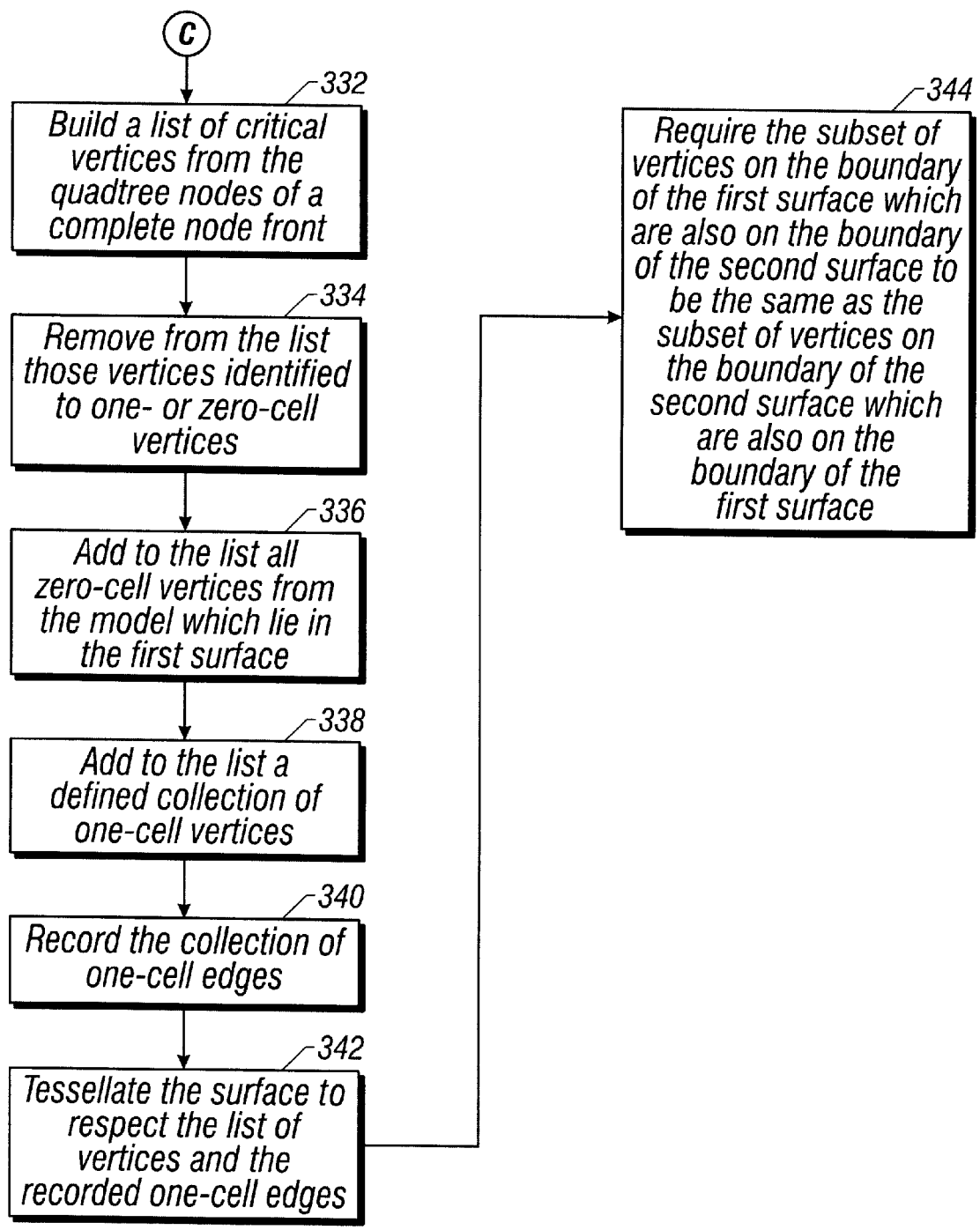

Decimation begins with a list of critical vertices being built from the quadtree nodes of a complete node front 332, as shown in FIG. 30d.

Figure 31:
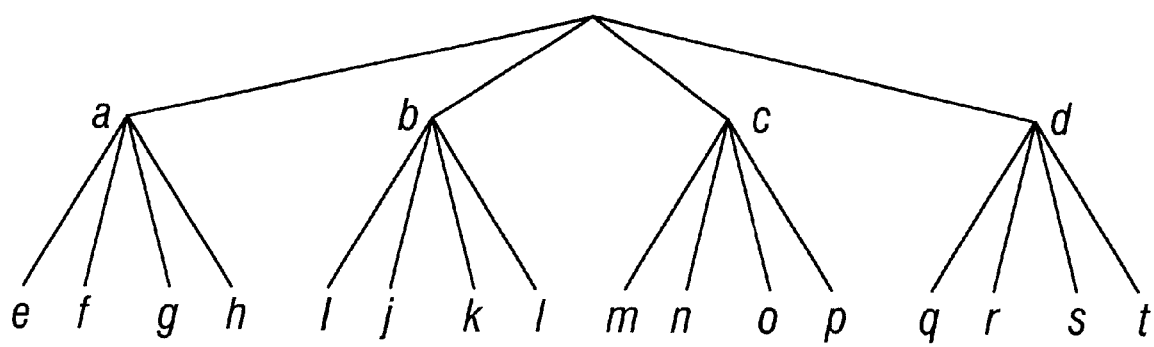
FIG. 31 represents a quadtree with leaf nodes at a fixed depth.

FIG. 31 is an example of a quadtree with leaf nodes at a fixed depth. Examples of node fronts are {b,c,q,s,t} and {a,c,d}. Examples of complete node fronts are {a,b,c,d} and {a,i,j,k,l,c,d}. An example of a non-node front is {a,e,b,c,d}. The collection {a,e,b,c,d} is not a node front because "e" does not have a unique ancestor in the collection.

The vertices identified to one- or zero-cell vertices is removed from the list 334 (FIG. 30d). All zero-cell vertices from the model which lie in the first surface are added to the list 336. A defined collection of one-cell vertices is added to the list 338. The collection of one-cell edges is recorded 340. The surface is tessellated to respect the list of vertices and the recorded one-cell edges 342. A requirement is imposed that the subset of vertices on the boundary of the first surface which are also on the boundary of the second surface be the same as the subset of vertices on the boundary of the second surface which are also on the boundary of the first surface 344.

Figure 30E:
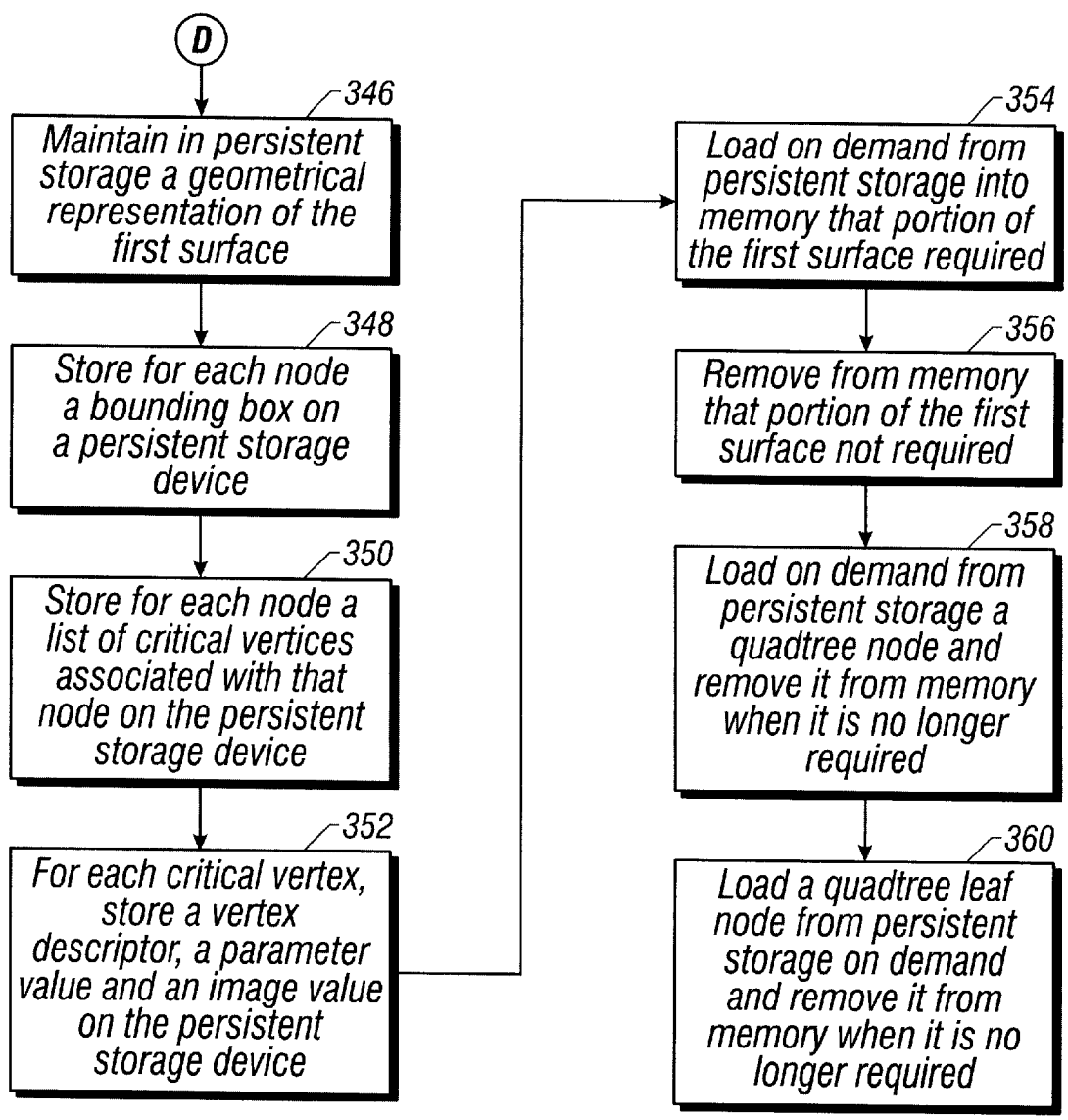

A first surface is partitioned into Ri nodes at resolution level-i using an i-level set of boundaries 288 (FIG. 30a). A geometrical representation of the first surface is maintained in persistent storage 346 (FIG. 30e). For each node, a bounding box is stored on a persistent storage device 348. For each node, a list of critical vertices associated with that node is stored on the persistent storage device 350. For each critical vertex, a vertex descriptor, a parameter value and an image value are stored on the persistent storage device 352. The required portion of the first surface is loaded on demand from the persistent storage device 354 and that portion of the first surface not required is removed 356. A quadtree node is loaded on demand from persistent storage and removed when it is no longer needed 358. A quadtree leaf node is loaded on demand from persistent storage and removed when it is no longer needed 360.

In this way memory usage is conserved, and furthermore changes to the model are limited to the particular collection of sub-volumes specified.

Even with the ability to selectively load geometry at the macro-topological level there is still a memory usage problem. For example, the user of the GQI may want to load the whole earth model and view it. Using the multi-resolution hierarchy it is possible to selectively load portions of the geometry of the surfaces. For a user who is viewing the whole earth model it is not necessary to load the fine details of the model. It is sufficient to load a collection of nodes from the coarse levels of the quadtrees to give a good approximation to the earth model. For a user who is viewing a small part of the whole earth model, it is not necessary to load the finer levels of the quadtrees not in the viewing volume.

Consider computing the intersection of two surfaces. This requires loading all pairwise intersecting leaf nodes and then loading the simplices which these leaf nodes contain. This can be done in a recursive manner as follows. Load the bounding box for the root node of each quadtree of each surface. If there is no intersection between the bounding boxes then the two surfaces do not intersect. If there is an intersection choose one of the nodes and load its children's bounding boxes and mark the node's bounding box for removal from memory. Now intersect the children's bounding boxes with the bounding box of the node from the other tree. If there is an intersection then recurse down the branches of the trees by loading the bounding boxes of the children nodes and intersecting with the bounding boxes from the other tree until the leaf nodes are reached. If there is no intersection then stop the recursion. This results in pairs of intersecting quadtree leaf nodes. Now load all the simplices which are contained in the leaf nodes and pass them to the geometry engine.

The partial loading algorithm described above for the intersection algorithm can be applied to all algorithms which reference information in the hierarchical surface. In particular, it can be applied to the migration algorithm where nodes, simplices and vertices can be selectively loaded from disk.

To achieve optimum performance, it is essential, when local changes are made to the model, that it is possible to map these changes to local updates in the persistent storage. An example of a local change is to modify the (x,y,z) position of a vertex. To maintain efficient persistent storage, it is essential this (x,y,z) position is at a limited number of locations in persistent storage, and preferably should be at a unique location. The mapping architecture is described below and is achieved by mapping the quadtree structure to persistent storage.

A quadtree node consists of a fixed size component, the bounding box, and a variable sized component, the list of critical vertices. For efficiency, these two components are maintained in separate locations in persistent storage. In persistent storage the fixed size component models the situation in memory and uses a mix of linear array indexing with linked-list indexing at the finer levels.

The architecture for storing the critical vertices is more complicated and is described below.

When saving a vertex to disk it is necessary to store the vertex descriptor (the list of leaf keys), the parameter value of the vertex, and the image value of the vertex.

All vertices that are identified with 0-cell or 1-cell vertices are stored separately and are loaded whenever the surface is loaded into core memory. The SHAPES geometry engine maintains an index that is used to refer to the 0-cell or 1-cell vertices this vertex is identified with. For the geometry engine to rebuild the identification structures the vertex must store its index and on loading must restore the index.

All other critical vertices are stored at the quadtree node, which is the finest common ancestor of all the leaf keys in the vertex descriptor.

Figure 32:
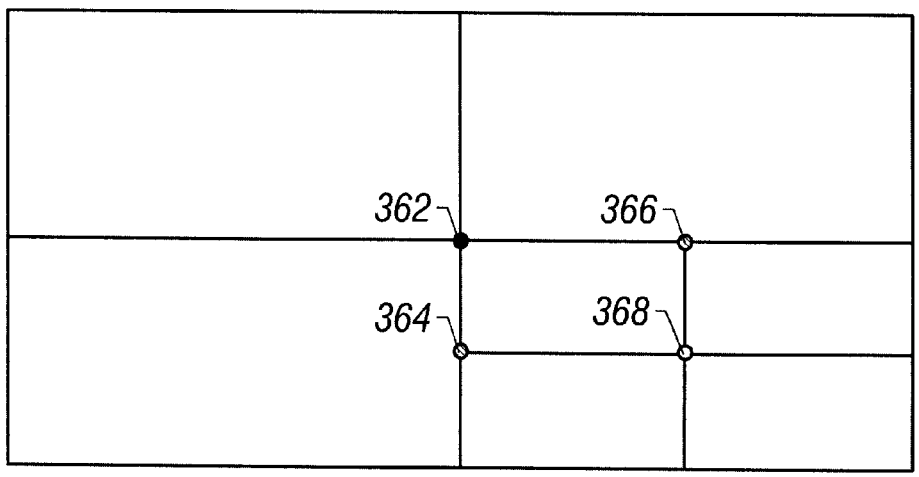
FIG. 32 illustrates parent critical, edge critical and sub-critical vertices.

A quadtree node has three types of critical vertices, illustrated in FIG. 32. The type of critical vertex can be determined from the number of unique keys at the parent level.

Let v be a critical vertex at level i+1. As discussed above, this implies:

$k_{i+1}(v) > \dim(v)$

Accordingly, v must be either parent critical, edge critical or sub-critical:

1. v is "parent critical" (e.g. node 362, FIG. 32) if:

$k_i(v) > \dim(v)$ 2. v is "edge critical" (e.g. nodes 364 and 366) if the vertex was not critical at the parent level and lies on the boundary of the parent node:

$k_i(v) = \dim(v)$ 3. v is "sub-critical" (e.g. node 368) if the vertex is neither parent critical nor edge critical:

$k_i(v) < \dim(v)$

The critical vertices of a quadtree node are maintained in three lists, the parent critical, the edge critical and the sub-critical vertices. For the parent critical vertices the list is a list of indices into the parent critical vertices. For the sub-critical vertices, the vertex is stored at the parent node, because the parent is the finest common ancestor of the list of leaf keys. The list of sub-critical vertices is a list of indices into the vertices stored at the parent node. Identifying an edge critical vertex requires a quadtree key, which specifies the node, which stores the vertex, together with an index into the list of stored vertices of the node that stores the vertex.

The list of vertices which is stored at a particular node can be broken into a collection of buckets. For example, every vertex has a unique depth, this being the depth when the vertex first becomes critical. For the quadtree nodes that are at the vertex's depth and have the vertex as a critical vertex, the vertex must be either edge critical or sub-critical for all these quadtree nodes. Thus, the list of stored vertices can be broken into vertices that will be edge critical vertices and vertices that will be sub-critical vertices. The edge critical vertices can be broken down further by finding the pair of quadtree keys at the depth of the vertex and by identifying the child index of each key in its parent which gives a pair of two bit indices which when ordered can be used to identify a bucket. The edge bucket can be further broken down by using the depth of each vertex. In fact, an edge bucket inherits a binary tree from the quadtree structure (it is the restriction of the quadtree to the particular edge), and this can be used to provide hierarchical loading of the edge critical vertices.

Figure 33:
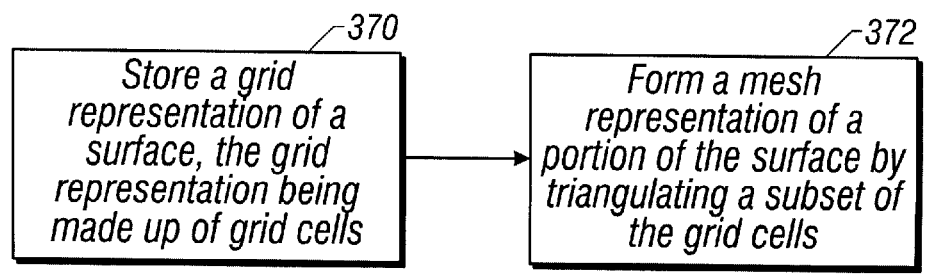

The quadtree leaf node has an additional component beyond the other nodes in the tree and that is the mesh representation of the node. This is a simple list of triples of indices specifying the indices into the critical vertices, edge vertices and internal vertices of this quadtree node. As illustrated in FIG. 33, a grid representation of a surface is stored, the grid being made up of grid cells 370. A mesh representation of a portion of the surface is then formed by triangulating a subset of the grid cells 372.

Since the quadtree leaf node must contain the list of simplices, the mesh content of the leaves is stored in a separate location on the disk. This storage is implemented using a blocked linked list. This allows maximum flexibility for adding and deleting simplices from the database, but provides an efficient means to load a particular leaf node.

It is also possible to implement a multiresolution hierarchy for multivalued surfaces, as discussed below.

The GQI must be able to import a triangulated surface defined as an Inventor face set. The simplices in the face set can be oriented in a completely arbitrary manner, and overall the surface can be multi-valued and non-manifold. While it is possible to formally apply the quadtree partitioning scheme to such a surface, it is unlikely that the tiling element patches will be connected. What is needed is a mapping of the surface onto a planar region that preserves the surface's simplicial connectivity.

One approach for constructing this mapping is to model the surface deformation as an energy minimization problem whose solution is consistent with Hamilton's Least Action Principle:

Given an elastic surface $g(u,v,t) = (x(u,v,t), y(u,v,t), z(u,v,t))$ that is to be deformed into a shape $g'(u,v,t) = (x'(u,v,t), y'(u,v,t), z'(u,v,t))$. Assume that a set of imaginary massless springs join sample points on g to their final place on g'. Then the motion of deformation follows a path in time such that the action $$\int_a^b (K(g, g', u, v, t) - P(g, g', u, v, t)) dt$$

is minimized. (The time interval is [a,b], K is the surface system's kinetic energy, and P is its potential energy. The difference K-P is the system's "LaGrangian".)

In order to apply this principle to triangulated surfaces, the surface must be "sampled" at its vertices. An application can constrain the potential energy in time three ways:

1. By the position of each vertex. The position constraint applied to the potential energy stored in the springs is defined by $$\frac{1}{2} \int\int C(g'-g)^2 du dv$$

where C is a spring constant that is a function of the (u,v) sample coordinate. Frequently, C is independent of the (u,v) sample coordinate. The Euler-LaGrange theorem applied to the minimization of this integral says that the deformation g'(u,v,t) must converge to g(u,v,t) over time.

2. By the orientation of the surface at each sample vertex. The orientation constraint is defined by $$\frac{1}{2} \int\int D\left(\left(\frac{\partial g'}{\partial u} - \frac{\partial g}{\partial u}\right)^2 + \left(\frac{\partial g'}{\partial v} - \frac{\partial g}{\partial v}\right)^2\right) du dv$$

where D denotes a different spring constant. Again, D is usually set to a fixed common value. The Euler-LaGrange theorem applied to the minimizing function for this integral says that the deformation g(u,v,t) must be a harmonic function. This is good, because a harmonic function causes the least distortion to the aspect ratio of the simplices on the deformed surface. A sliver results when the aspect ratio of a simplex is poor. Therefore, if the intention is to tessellate the planar deformation, then minimizing the number of slivers and their degree of malformation is important.

3. Finally, the curvature constraint applied to the spring's potential energy is given by a minimizing function for the integral equation, $$\frac{1}{2}\int\int E\left(\left(\frac{\partial^2 g'}{\partial u^2} - \frac{\partial^2 g}{\partial u^2}\right)^2 + \left(\frac{\partial^2 g'}{\partial u \partial v} - \frac{\partial^2 g}{\partial u \partial v}\right)^2 + \left(\frac{\partial^2 g'}{\partial v^2} - \frac{\partial^2 g}{\partial v^2}\right)^2\right) du dv$$

where E is a spring constant. Again, E is usually set to a fixed common value. The Euler-LaGrange theorem says that a minimizing function for this constraint satisfies a biharmonic relation. This form of constraint is used in some grid-based surface modeling systems. Typically, the full surface is subdivided into small patches. On each patch a solution is computed, and some form of smoothing is applied across the interface between two patches.

A GQI surface is triangulated, so the minimizing function must preserve the valence of every vertex. Hence a linear harmonic deformation is ideal. Hamilton's Principle says nothing about how vertex pairs, i.e., the edges that form the topology, deform. This is significant, because a smooth vertex deformation can reposition the vertex endpoints of a set of connected simplex edges so that the deformed edges cross, failing to preserve the surface's topological definition. When this happens, the GQI has to split the surface before the folding occurs and restart the process on the remainder of the surface. Thus, the deformation of a surface feature may be defined as a large number of cells. A large cell count slows down classification, and forces the GQI to create a quadtree for each 2-cell, exploding memory. What is needed is a method to parameterize the surface given just the surface's vertex and simplex connectivity, i.e., a topology based method.

A method is described below for construction of a single 2-cell for the case that the surface is oriented with an arbitrary number of holes. This method does not control metric distortion, in contrast to a harmonic deformation. The GQI computes this deformation in order to construct a quadtree rather than as preparation for further tessellation, so some distortion is acceptable. When applied to a gridded triangulated surface, the mapping is equivalent to the projection of the surface onto one of the coordinate planes.

Let F, E, and V be the number of faces, edges, and vertices, respectively, of a triangulated surface. The Euler Characteristic X of the surface is defined as X=F−E+V. When the surface is presented in "normal" form, the Euler Characteristic X of an oriented surface is equal to X=2−(2·g+r), where g denotes the genus of the surface (which equals the number of embedded tori) and r is the number of boundary curves ("holes"), grouped into GQI frames. FIG. 34 lists some common surfaces and their Euler Characteristics.

A standard result in topology is that two oriented surfaces are homeomorphic if and only if they have the same genus and number of frames. The Euler Characteristic is a function of genus and the number of frames, so it follows that the Euler Characteristic is independent of the triangulation. The GQI supports queries for the evaluation of F, E, and V, as well as frames. Thus two oriented triangulated surfaces that have the same Euler Characteristic and the same number of frames must be homeomorphic.

In geological applications, multivalued surfaces such as a recumbent fault, a salt body, or a horizontal wellbore are encountered. All three surfaces have genus zero and have Euler Characteristic 0, 1 or 2, assuming that the surface has zero internal holes. The quadtree construction assumes that the surface is single-valued in its (u,v) coordinates, so to apply the quadtree construction to a multi-valued surface, it is necessary to construct a homeomorphism between the surface and a single-valued representation with the correct Euler Characteristic. If the original surface has Euler Characteristic 1, e.g., a recumbent fault, a good choice is to map it onto a planar square or family of connected squares. If the original surface has Euler Characteristic 0, e.g., a wellbore, then the square should be replaced by a squared annulus. Finally if the surface has Euler Characteristic 2, then it can be split into two equal-area parts with each part of Euler Characteristic 1 with the previous construction applied to each part.

Figure 35A:
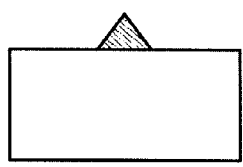
Figure 35B:
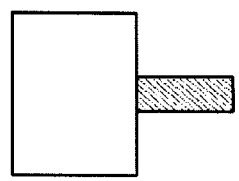
Figure 35C:
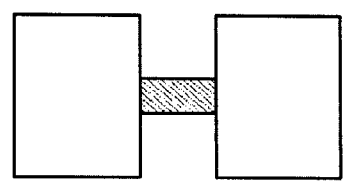
Figure 36A:
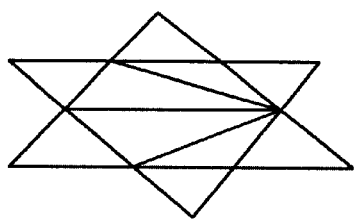
Figure 36B:
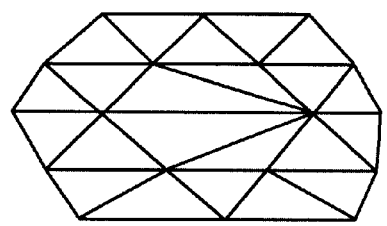

Here are the steps in the construction of the homeomorphism between a set of connected planar squares and an oriented genus 0 triangulated surface with Euler Characteristic 1. Build the surface as a non-parametric web, so that the non-manifold boundaries are apparent. From now on, assume that the surface is a 2-manifold.
2. Find the surface's external boundary curve, which is defined by the zeroth GQI frame instance. Analyze the external boundary for embedded disc obstructions, as shown in FIG. 35. Remove each Type (a) obstruction by adding a new vertex plus edges to form a new simplex that uses the obstructing vertex as a corner, as shown in FIG. 36. If a Type (b) obstruction is detected, then exclude it from the remainder of the algorithm and at the conclusion add it to the final planar square. If a Type (c) obstruction is detected, then split the surface into three parts, building two squares and a connector, essentially reducing to a Type (b) problem.

3. Compute the area of the (possibly extended) surface, ignoring Type (b) obstructions, and construct a square of that size. The area of each surface simplex can be computed from the cross product of two sides of the simplex, thought of as vectors. Randomly select four points along the external boundary that are spaced roughly ¼ of the contour apart from each other. These points are mapped to the corners of the square. The remaining points are assigned in relative proportion to the appropriate side of the square. Initialization is now complete.

Figure 37A:
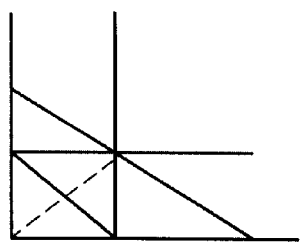
Figure 37B:
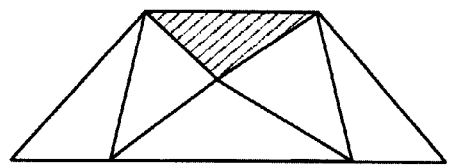
Figure 37C:
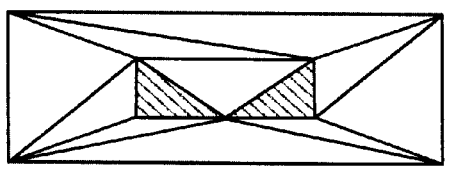
Figure 10A:
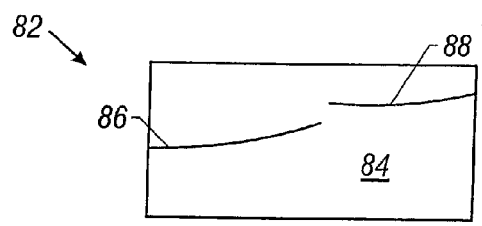
Figure 10B:
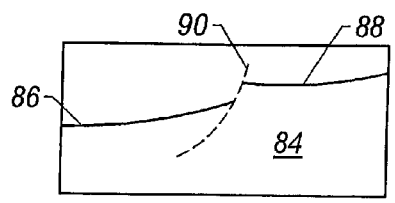
Figure 10C:
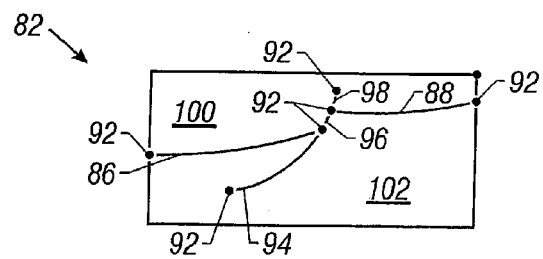
Figure 29A:
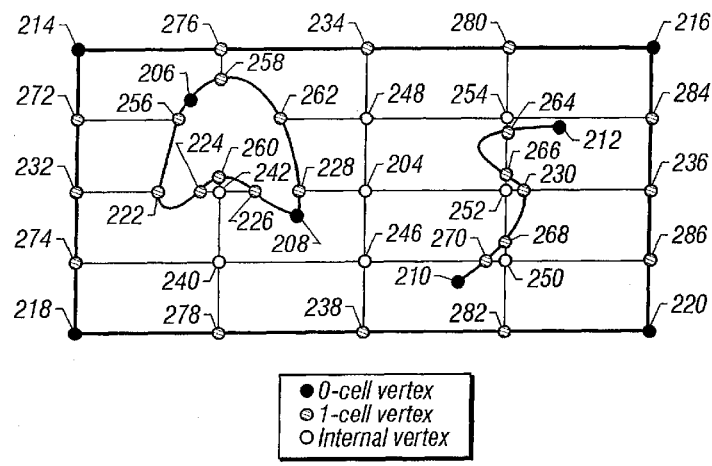
Figure 29B:
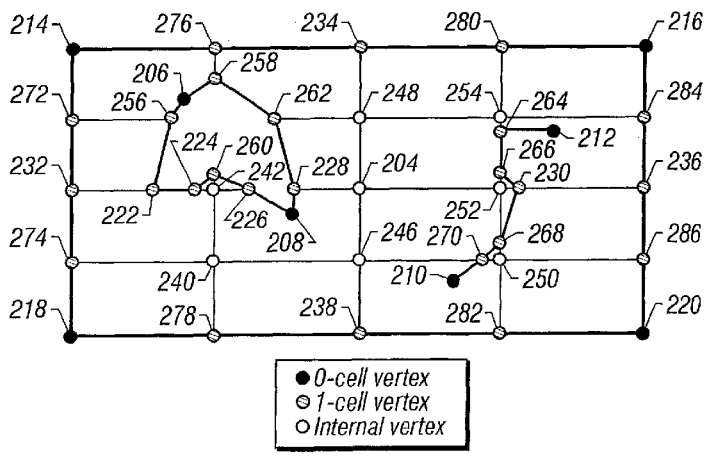

4. Determine the contour formed from the set of all vertices connected to the most recently defined contour, as shown in FIG. 37. First find four vertices on the new contour that are connected to the corners of the old contour. If no edge exists between a corner to the new contour, then split the obstructing simplex. Note that this might cause other simplices to split. A good choice of a second vertex is the simplex's barycenter. In part (a) of FIG. 37, the dotted edge has been added to join the two corners.

5. If two edges of the contour form a Type (a) obstruction, then redefine the new contour to include that simplex unless the obstruction simplex's valence 2 vertex is directly connected to a corner vertex of the previous contour. In part (b) of FIG. 37, the dark simplex is a Type (a) obstruction. Assuming that the valence 2 vertex is not directly connected to a corner vertex of the previous contour, remove the obstruction by incorporating the obstructing simplex's remaining edge into the new contour, effectively flattening the contour. In FIG. 37 the two offending interior corners do not obstruct the direct connection to corner vertices of the previous contour, so both offenders can be safely ignored.

6. Since the full surface is oriented and of genus 0, the set of simplices connecting the two contours is also oriented and of genus 0. Assuming that the surface has no holes and contains no Type (a) obstructions and no non-manifold linkage of the interior and exterior contours, it follows that the surface patch defined by this set of simplices has Euler Characteristic. Referring to FIG. 38, the patch is homeomorphic to the lateral surface of a truncated square-based pyramid. Deform the surface formed by the simplices between the two contours into the lateral surface of a truncated square-based pyramid, then project the upper contour onto the interior of the square defined by the lower contour, as shown in FIG. 38. Note that two edges on a lateral face cross if and only if their projection cross, explaining why the choice of a lateral surface of a square-based pyramid. If a corner simplex was split in step #4, then replace its split parts by the projection of the original simplex.

7. It is possible that the interior and exterior contours together describe a connected sum of lateral surfaces of square-based pyramids, due to Type (a) obstructions, or meet in a non-manifold manner, see FIG. 39. An example of this would be an otherwise flat surface on which two hills exist. If this happens, the process divides the surface into the number of connected components identified by the interior contour and applies the construction to each component. (Note that the hexagonal region between the two shaded areas has Euler Characteristic 1, so it is homeomorphic to a disc.) When this happens, the algorithm is applied to each sub-square and any Type (a) obstructions are filled in. A homeomorphism preserves continuity, so the number of embedded squares equals the number of hills and valleys in the multi-valued surface. Note that running the construction in reverse is a simple way to create a surface with any number of hills and valleys, salt domes, etc.

8. Repeat this identification until the current contour is the boundary of an embedded disk, as shown in FIG. 40. Complete the square construction by deforming the indicated disk to a square and adding it in.

9. It is possible that there may not be four distinct vertices on a contour, e.g., a pyramid formed with a triangle cap and a square base. If this happens, then the nested square is replaced by a triangle and the construction proceeds as above, as shown in FIG. 41.

Loosely speaking, the homeomorphism "melts" the surface onto a plane. Consequently, points close together in (x,y,z) space may not be close together in the plane. (This is another way of saying that this method does not control metric distortion.) An extreme example is a spherical surface with a tiny hole at a pole. If the hole is used as the initial boundary, then the triangles forming the boundary can be quite distorted in the mapping plane. When the surface is single-valued, it may be acceptable to use the projection of the bounding box onto the appropriate plane as the initial square and create nested square-sided annuli that proportional with respect to area. In any case, distortion is not a problem, since the planar version of the surface is used only to facilitate the quadtree decomposition of the surface. The GQI constructs the quadtree on the homeomorphic planar region, then lifts it back. The only significant change in the quadtree hierarchy API is that ray picking can return more than one tiling element even when the ray does not pick a simplex corner.

This construction can be applied to a surface with an arbitrary number of holes in it by adding to the area of the tiling cover of each hole to the area of the original surface. Also, this approach can tile a toroidal shape. Indeed, all that is needed is to randomly choose two closed paths in opposing directions, then "unroll" the toroidal shape along the two paths. Assuming that the surface has no holes, the two formulas for the Euler Characteristic can be equated to infer when a toroidal shape is present and the quadtree construction applied to each toroidal element. Not much is made of this, however, because toroidal structures are seldom encountered in geological modeling.

The invention has application outside the field of geological modeling. In particular, the invention has application in any field in which data are presented geometrically and graphically at more than one level of resolution. For example, the invention would be useful in representing medical models, such as those developed in magnetic resonance imaging ("MRI"). Further, the invention would be useful in representing computer aided design ("CAD") models.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

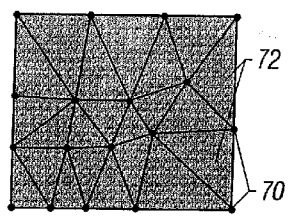
FIG. 8A
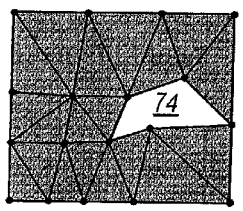
FIG. 8B
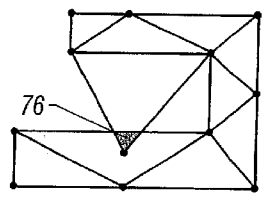
FIG. 8C
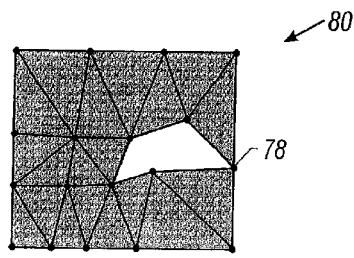

What is claimed is:

1. A method for modeling one or more physical objects on a computer system having a processor, a memory, a persistent storage system, at least one input device, and at least one output device, the method and a model being stored on a computer-readable media, the method comprising:

representing the model at multiple levels of resolution wherein a first surface of the model is represented at multiple levels of resolution, the first surface comprising zero or more zero-cells, zero or more one-cells and one or more two cells, including the steps of:

partitioning the first surface with one or more boundaries, each level of resolution having a subset of the boundaries;

partitioning the first surface into $n_i$ nodes at resolution level-i using the level-i subset of boundaries;

associating each level-i+1 node with a unique level-i node;

associating with each level-i node the level-i+1 nodes associated to the node;

associating with each level-i node a subset of vertices that are critical at resolution level i;

designating each node at resolution level d a leaf node;

associating each simplex to a unique leaf node; and associating with each leaf node the simplices associated to that leaf node; and wherein each node except the leaf nodes has a subtree, further comprising splitting the original tree into new trees and associating each new tree with a new cell;

presenting the model to the at least one output device; and performing an operation using the model as input, the operation selected from the set including rendering the model, displaying the model, displaying at least one aspect of the model, displaying the topology of the model, determining the surfaces that bound a volume of the model and displaying an indication of which surfaces bound said volume of the model, determining the surfaces that lie within a volume of the model and displaying an indication of which surfaces lie within said volume of the model, determining fluid flow between compartments of the model, and analyzing geological properties of a geological formation modeled by the model.

2. The method of claim 1 further comprising:

associating with a level-i node the list of simplices which is the union of all simplices associated with the level-i+1 nodes associated to the level-i node.

3. The method of claim 2 further comprising assigning the subset of boundaries for each node the boundary of the union of the simplices associated with that node.

4. The method of claim 3 wherein the nodes form an original tree and each node is assigned a unique key.

5. The method of claim 4 further comprising:

assigning to each vertex in a leaf node the key corresponding to that leaf node.

6. The method of claim 5 further comprising:

storing the representation of a second surface in the computer-readable media, the second surface having nodes, leaf nodes, vertices, critical vertices and simplices.

7. The method of claim 6 further comprising:

determining which leaf nodes of the first surface intersect the leaf nodes of the second surface;

determining the intersecting simplices from the first and second surfaces from the simplices associated to the intersecting leaf nodes.

8. The method of claim 5, wherein a complete node front of the tree of the first surface and a collection of vertices on a boundary of the first surface are defined, further comprising:

building a list of critical vertices from the tree nodes of the complete node front;

removing from the list those vertices identified to one- or zero-cell vertices;

adding to the list all zero-cell vertices from the model which lie in the first surface;

adding to the list the defined collection of one-cell vertices;

recording the collection of one-cell edges; and tessellating the surface to respect the list of vertices and the recorded one-cell edges.

9. The method of claim 8 further comprising:

requiring the subset of vertices on the boundary of the first surface which are also on the boundary of the second surface to be the same as the subset of vertices on the boundary of the second surface which are also on the boundary of the first surface.

10. The method of claim 1 further comprising:

maintaining in a persistent storage a geometrical representation of the first surface.

11. A method for modeling one or more physical objects on a computer having a processor, a memory, a persistent storage system, at least one input device, and at least one output device, the method and a model being stored on a computer-readable media, the method comprising:

representing the model at multiple levels of resolution wherein a first surface of the model is represented at multiple levels of resolution, the first surface comprising zero or more zero-cells, zero or more one-cells and one or more two cells, including the steps of:

partitioning the first surface with one or more boundaries, each level of resolution having a subset of the boundaries;

wherein each node except the leaf nodes has a subtree, further comprising splitting the original tree into new trees and associating each new tree with a new cell; and performing an operation using the model as input, the operation selected from the set including rendering the model, displaying the model, displaying at least one aspect of the model, displaying the topology of the model, determining the surfaces that bound a volume of the model and displaying an indication of which surfaces bound said volume of the model, determining the surfaces that lie within a volume of the model and displaying an indication of which surfaces lie within said volume of the model, determining fluid flow between compartments of the model, and analyzing geological properties of a geological formation modeled by the model.

12. The method of claim 11 further comprising identifying the subtrees of the original tree which have no intersecting leaf nodes with one of the new cells.

13. The method of claim 12 fuirther comprising:

splitting the simplices of the first surface along the intersection curve;

forming new simplices by tessellating the split simplices to respect the macro-topology of one-cells and zero-cells passing through the original simplices;

building a new tree for each new cell;

assigning each new simplex to the leaf node of the tree created for the new cell to the which the new simplex belongs;

for each leaf node of each new tree, migrating each simplex in the original tree which is connected to a new simplex in the new tree leaf node and which lies in the same tree leaf node as the new simplex;

determining the neighbors of a tree node by finding all the keys of all the critical vertices in the node; and determining the coarsest level node which is an ancestor of a key from the critical vertices in the migrated tree nodes and has not been split or migrated and migrating that node to the new tree.

14. The method of claim 1 further comprising:

storing for each node a bounding box on a persistent storage device, and storing for each node a list of critical vertices associated with that node on the persistent storage device.

15. The method of claim 14 wherein storing the list of critical vertices comprises:

storing a vertex descriptor for each vertex;

storing a parameter value for each vertex; and storing an image value for each vertex.

16. The method of claim 15 further comprising loading on demand from persistent storage into memory that portion of the first surface required and removing from memory that portion of the first surface not required.

17. The method of claim 16 wherein a tree node is loaded from persistent storage on demand and is removed from memory when no longer required.

18. The method of claim 17 wherein the simplices associated with a tree leaf node are loaded from persistent storage on demand and removed from memory when no longer required.

19. A method for modeling one or more physical objects on a computer system having a processor, a memory, a persistent storage system, at least one input device, and at least one output device, the method and a model being stored on a computer-readable media, the method representing the model on one of the output devices, the method comprising:

representing a first surface at multiple levels of resolution, the first surface comprising zero or more zero-cells, zero or more one-cells and one or more two cells, including the steps of:

partitioning the first surface with one or more boundaries, each level of resolution having a subset of the boundaries; and parameterizing the first surface, wherein the first surface has one or more terminating contours and is tessellated into triangles, wherein parameterizing comprises if the first surface is not of Euler Characteristic 1:
cutting the first surface into patches, each patch being of Euler Characteristic 1; and perform an operation using the model as input, the operation selected from the set including rendering the first surface, displaying the first surface, displaying at least one aspect of the first surface, displaying the topology of the first surface with respect to other surfaces, determining whether the surface bounds a volume and displaying an indication of the surface which bounds said volume, determining whether the surface lies within a volume and displaying an indication of the surface which bounds said volume, determining fluid flow between compartments of a model which the first surface is a part of, and analyzing geological properties of a geological formation modeled by the first surface.

20. The method of claim 19 wherein parameterizing comprises repeating until reaching all terminating contours and all triangles have been processed:
if an annulus of triangles around the boundary of the remaining triangles in a patch cannot be identified because of an obstruction:
refining the obstruction by adding exterior edges until the obstruction is absorbed into the annulus;
constructing a parameterization of the annulus.

21. The method of claim 1, further comprising filling a hole in the first surface with a tile.

22. The method of claim 21 further comprising parameterizing the first surface, wherein the first surface has one or more terminating contours and is tessellated into triangles, wherein parameterizing comprises repeating until reaching all terminating contours and all triangles have been processed:
if an annulus of triangles around the boundary of the remaining triangles of the first surface with the hole filled cannot be identified because of an obstruction:
refining the obstruction by adding exterior edges until the obstruction is absorbed into the annulus;
constructing a parameterization of the annulus.

23. A computer system for modeling one or more physical objects on a computer system having a processor, a data storage system, at least one input device, and at least one output device, the first surface being stored on the data storage system, the computer system comprising:

means for partitioning the first surface with one or more boundaries, each level of resolution having a subset of the boundaries;

means for partitioning the first surface into $n_i$ nodes at resolution level-i using the level-i subset of boundaries;

means for associating each level-i+1 node with a unique level-i node;

means for associating with each level-i node the level-i+1 nodes associated to the node;

means for associating with each level-i node a subset of vertices that are critical at resolution level i;

means for designating each node at resolution level d a leaf node;

means for associating each simplex to a unique leaf node;

means for associating with each leaf node the simplices associated to that leaf node;

wherein each node except the leaf nodes has a subtree, further comprising means for splitting the original tree into new trees and associating each new tree with a new cell; and means for performing an operation using the model as input, the operation selected from the set including rendering the model, displaying the model, displaying at least one aspect of the model, displaying the topology of the model, determining the surfaces that bound a volume of the model and displaying an indication of which surfaces bound said volume of the model, determining the surfaces that lie within a volume of the model and displaying an indication of which surfaces lie within said volume of the model, determining fluid flow between compartments of the model, and analyzing geological properties of a geological formation modeled by the model.

24. The computer system of claim 23 further comprising means for parameterizing the first surface, wherein the first surface has one or more terminating contours and is tessellated into triangles, wherein the means for parameterizing comprises if the first surface is not of Euler Characteristic 1:
means for cutting the first surface into patches, each patch being of Euler Characteristic 1.

25. The computer system of claim 24, wherein the means for parameterizing comprises means for repeating until reaching all terminating contours and all triangles have been processed:
if an annulus of triangles around the boundary of the remaining triangles in a patch cannot be identified because of an obstruction:
means for refining the obstruction by adding exterior edges until the obstruction is absorbed into the annulus;
means for constructing a parameterization of the annulus.

26. The computer system of claim 23, further comprising means for filling a hole in the first surface with a tile.

27. The computer system of claim 23 further comprising:
means for associating with a level-i node the list of simplices which is the union of all simplices associated with the level-i+1 nodes associated to the level-i node.

28. The computer system of claim 27 further comprising means for assigning the subset of boundaries for each node the boundary of the union of the simplices associated with that node.

29. The computer system of claim 28 wherein the nodes form an original tree and each node is assigned a unique key.

30. The computer system of claim 29 further comprising:
means for assigning to each vertex in a leaf node the key corresponding to that leaf node.

31. The computer system of claim 30 further comprising:
means for storing the representation of a second surface in the computer-readable media, the second surface having nodes, leaf nodes, vertices, critical vertices and simplices.

32. The computer system of claim 31 further comprising:
means for determining which leaf nodes of the first surface intersect the leaf nodes of the second surface;

means for determining the intersecting simplices from the first and second surfaces from the simplices associated to the intersecting leaf nodes.

33. A computer system for modeling one or more physical objects on a computer system having a processor, a data storage system, at least one input device, and at least one output device, the first surface being stored on the data storage system, the computer system comprising:

means for partitioning the first surface with one or more boundaries, each level of resolution having a subset of the boundaries;

means for splitting the original tree into new trees and associating each new tree with a new cell; and means for performing an operation using the first surface as input, the operation selected from the set including rendering the first surface, displaying the first surface, displaying at least one aspect of the first surface, displaying the topology of the first surface with respect to other surfaces, determining whether the first surface bound a volume, determining the surfaces that lie within a volume of the model and displaying an indication of which surfaces bound said volume of the model, determining fluid flow between compartments of the model and displaying an indication of which surfaces bound said volume of the model, and analyzing geological properties of a geological formation modeled by the model.

34. The computer system of claim 33 further comprising means for identifying the subtrees of the original tree which have no intersecting leaf nodes with one of the new cells.

35. The computer system of claim 34 further comprising:
means for splitting the simplices of the first surface along the intersection curve;

means for forming new simplices by tessellating the split simplices to respect the macro-topology of one-cells and zero-cells passing through the original simplices;

means for building a new tree for each new cell;

means for assigning each new simplex to the leaf node of the tree created for the new cell to the which the new simplex belongs;

for each leaf node of each new tree, means for migrating each simplex in the original tree which is connected to a new simplex in the new tree leaf node and which lies in the same tree leaf node as the new simplex;

means for determining the neighbors of a tree node by finding all the keys of all the critical vertices in the node; and means for determining the coarsest level node which is an ancestor of a key from the critical vertices in the migrated tree nodes and has not been split or migrated and migrating that node to the new tree.

36. The computer system of claim 30, wherein a complete node front of the tree of the first surface and a collection of vertices on a boundary of the first surface are defined, further comprising:

means for building a list of critical vertices from the tree nodes of the complete node front;

means for removing from the list those vertices identified to one- or zero-cell vertices;

means for adding to the list all zero-cell vertices from the model which lie in the first surface;

means for adding to the list the defined collection of one-cell vertices;

means for recording the collection of one-cell edges; and means for tessellating the surface to respect the list of vertices and the recorded one-cell edges.

37. The computer system of claim 36 further comprising:

means for requiring the subset of vertices on the boundary of the first surface which are also on the boundary of the second surface to be the same as the subset of vertices on the boundary of the second surface which are also on the boundary of the first surface.

38. The computer system of claim 23 further comprising:

means for maintaining in a persistent storage a geometrical representation of the first surface.

39. The computer system of claim 23 further comprising:

means for storing for each node a bounding box on a persistent storage device, and storing for each node a list of critical vertices associated with that node on the persistent storage device.

40. The computer system of claim 39 wherein the means for storing the list of critical vertices comprises:

means for storing a vertex descriptor for each vertex, means for storing a parameter value for each vertex, and means for storing an image value for each vertex.

41. The computer system of claim 40 further comprising means for loading on demand from persistent storage into memory that portion of the first surface required and means for removing from memory that portion of the first surface not required.

42. The computer system of claim 41 wherein the means for loading loads a tree node from persistent storage on demand and the means for removing removes a tree node from memory when it is no longer required.

43. The computer system of claim 42 wherein the means for loading loads simplices associated with a tree leaf node from persistent storage on demand and the means for removing removes simplices from memory when they are no longer required.

44. The computer system of claim 23, wherein the means for parameterizing comprises means for repeating until reaching all terminating contours and all triangles have been processed:

if an annulus of triangles around the boundary of the remaining triangles of the first surface with the hole filled cannot be identified because of an obstruction:

means for refining the obstruction by adding exterior edges until the obstruction is absorbed into the annulus;

means for constructing a parameterization of the annulus.

45. A computer program, residing on a computer-readable medium, comprising instructions for causing a computer, comprising a processor, a data storage system, at least one input device, and at least one output device, to model one ore more physical objects, the computer program comprising instructions for causing the computer to:

represent a first surface at multiple levels of resolution, the first surface comprising zero or more zero-cells, zero or more one-cells and one or more two cells, by:

partition the first surface with one or more boundaries, each level of resolution having a subset of the boundaries;

partition the first surface into $n_i$ nodes at resolution level-i using the level-i subset of boundaries;

associate each level-i+1 node with a unique level-i node;

associate with each level-i node the level-i+1 nodes associated to the node;

associate with each level-i node a subset of vertices that are critical at resolution level i;

designate each node at resolution level d a leaf node;

associate each simplex to a unique leaf node;

associate with each leaf node the simplices associated to that leaf node;

associate a subtree with each node except the leaf nodes; and cause the computer to split the original tree into new trees and to associate each new tree with a new cell; and perform an operation using the model as input, the operation selected from the set including rendering the model, displaying the model, displaying at least one aspect of the model, displaying the topology of the model, determining the surfaces that bound a volume of the model and displaying an indication of which surfaces lie within said volume of the model, determining the surfaces that lie within a volume of the model and displaying an indication of which surfaces lie within said volume of the model, determining fluid flow between compartments of the model, and analyzing geological properties of a geological formation modeled by the model.

46. The computer program of claim 45 further comprising instructions for causing the computer to parameterize the first surface, wherein the first surface has one or more terminating contours and is tessellated into triangles, wherein the computer program further comprises if the first surface is not of Euler Characteristic 1, instructions for causing the computer to:

cut the first surface into patches, each patch being of Euler Characteristic 1.

47. The computer program of claim 46 wherein the instructions for causing the computer to parameterize the first surface comprise instructions for causing the computer to repeat, until reaching all terminating contours and all triangles have been processed:

if an annulus of triangles around the boundary of the remaining triangles in a patch cannot be identified because of an obstruction:

instructions for causing the computer to refine the obstruction by adding exterior edges until the obstruction is absorbed into the annulus;

instructions for causing the computer to construct a parameterization of the annulus.

48. The computer program of claim 45, further comprising instructions for causing the computer to fill a hole in the first surface with a tile.

49. The computer program of claim 45, further comprising instructions for causing the computer to:

associate with a level-i node the list of simplices which is the union of all simplices associated with the level-i+1 nodes associated to the level-i node.

50. The computer program of claim 49 further comprising instructions for causing the computer to assign the subset of boundaries for each node the boundary of the union of the simplices associated with that node.

51. The computer program of claim 50 wherein the nodes form an original tree and each node is assigned a unique key.

52. The computer program of claim 51 further comprising instructions for causing the computer to:

assign to each vertex in a leaf node the key corresponding to that leaf node.

53. The computer program of claim 52 further comprising instructions for causing the computer to:
store the representation of a second surface in the computer-readable media, the second surface having nodes, leaf nodes, vertices, critical vertices and simplices.

54. The computer program of claim 53 further comprising instructions for causing the computer to:
determine which leaf nodes of the first surface intersect the leaf nodes of the second surface; and
determine the intersecting simplices from the first and second surfaces from the simplices associated to the intersecting leaf nodes.

55. A computer program, residing on a computer-readable medium, comprising instructions for causing a computer, comprising a processor, a data storage system, at least one input device, and at least one output device, to model one or more physical objects, the computer program comprising instructions for causing the computer to:
represent a first surface at multiple levels of resolution, the first surface comprising zero or more zero-cells, zero or more one-cells and one or more two cells, by instructions to:
partition the first surface with one or more boundaries, each level of resolution having a subset of the boundaries; and
associate a subtree with each node except the leaf nodes split the original tree into new trees and to associate each new tree with a new cell; and
perform an operation using the model as input, the operation selected from the set including rendering the first surface, displaying the first surface, displaying at least one aspect of the first surface, displaying the topology of the first surface with respect to other surfaces, determining whether the surface bounds a volume and displaying an indication of which surfaces bound said volume, determining whether the surface lies within a volume and displaying an indication of which surfaces bound said volume, determining fluid flow between compartments of a model which the first surface is a part of, and analyzing geological properties of a geological formation modeled by the first surface.

56. The computer program of claim 55 further comprising instructions for causing the computer to identify the subtrees of the original tree which have no intersecting leaf nodes with one of the new cells.

57. The computer program of claim 56 further comprising instructions for causing the computer to:
split the simplices of the first surface along the intersection curve;
form new simplices by tessellating the split simplices to respect the macro-topology of one-cells and zero-cells passing through the original simplices;
build a new tree for each new cell;
assign each new simplex to the leaf node of the tree created for the new cell to the which the new simplex belongs;
for each leaf node of each new tree, migrate each simplex in the original tree which is connected to a new simplex in the new tree leaf node and which lies in the same tree leaf node as the new simplex;
determine the neighbors of a tree node by finding all the keys of all the critical vertices in the node; and
determine the coarsest level node which is an ancestor of a key from the critical vertices in the migrated tree nodes and has not been split or migrated and migrate that node to the new tree.

58. The computer program of claim 52, wherein a complete node front of the tree of the first surface and a collection of vertices on a boundary of the first surface are defined, further comprising instructions for causing the computer to:
build a list of critical vertices from the tree nodes of the complete node front;
remove from the list those vertices identified to one- or zero-cell vertices;
add to the list all zero-cell vertices from the model which lie in the first surface;
add to the list the defined collection of one-cell vertices;
record the collection of one-cell edges; and
tessellate the surface to respect the list of vertices and the recorded one-cell edges.

59. The computer program of claim 58 further comprising instructions for causing the computer to:
require the subset of vertices on the boundary of the first surface which are also on the boundary of the second surface to be the same as the subset of vertices on the boundary of the second surface which are also on the boundary of the first surface.

60. The computer program of claim 45 further comprising instructions for causing the computer to:
maintain in a persistent storage a geometrical representation of the first surface.

61. The computer program of claim further comprising instructions for causing the computer to:
store for each node a bounding box on a persistent storage device, and store for each node a list of critical vertices associated with that node on the persistent storage device.

62. The computer program of claim 61 wherein the instructions for causing the computer to store the list of critical vertices comprises instructions for causing the computer to:
store a vertex descriptor for each vertex,
store a parameter value for each vertex, and
store an image value for each vertex.

63. The computer program of claim 62 further comprising instructions for causing the computer to load on demand from persistent storage into memory that portion of the first surface required and remove from memory that portion of the first surface not required.

64. The computer program of claim 63 wherein the computer program causes a tree node to be loaded from persistent storage on demand and to be removed from memory when no longer required.

65. The computer program of claim 64 wherein the computer program causes simplices associated with a tree leaf node to be loaded from persistent storage on demand and removed from memory when no longer required.

66. The computer program of claim 48 wherein the instructions for causing the computer to parameterize the first surface comprise
instructions for causing the computer to repeat, until reaching all terminating contours and all triangles have been processed:
if an annulus of triangles around the boundary of the remaining triangles of the first surface with the hole filled cannot be identified because of an obstruction:
instructions for causing the computer to refine the obstruction by adding exterior edges until the obstruction is absorbed into the annulus;

instructions for causing the computer to construct a parameterization of the annulus.

67. A method of constructing a geometric model, having a plurality of surfaces, on a computer having a processor, a memory, a persistent storage system, at least one input device, and at least one output device, comprising:

representing each surface of the model at at least one level of resolution;

representing a first surface at multiple levels of resolution;

using at least one operation, consisting of one or more Boolean operations, to classify the first surface into the model; and performing an operation using the model as input, the operation selected from the set including rendering the model, displaying the model, displaying at least one aspect of the model, displaying the topology of the model, determining the surfaces that bound a volume of the model and displaying an indication of which surfaces bound said volume of the model, determining the surfaces that lie within a volume of the model and displaying an indication of which surfaces lie within said volume of the model, determining fluid flow between compartments of the model, and analyzing geological properties of a geological formation modeled by the model.

68. The method of claim 67 further comprising:

decimating the model while preserving topology of the model.

69. The method of claim 68, wherein a complete node front of the tree of the first surface and a collection of vertices on a boundary of the first surface are defined, further comprising:

building a list of critical vertices from the tree nodes of the complete node front;

removing from the list those vertices identified to one- or zero-cell vertices;

adding to the list all zero-cell vertices from the model which lie in the first surface;

adding to the list the defined collection of one-cell vertices;

recording the collection of one-cell edges; and tessellating the surface to respect the list of vertices and the recorded one-cell edges.

70. The method of claim 69 further comprising:

determining a subset of vertices on the boundary of the first surface which are also on the boundary of the second surface;

determining a subset of vertices on the boundary of the second surface which are also on the boundary of the first surface; and requiring the subset of vertices on the boundary of the first surface which are also on the boundary of the second surface to be the same as the subset of vertices on the boundary of the second surface which are also on the boundary of the first surface.

71. The method of claim 70 further comprising:

maintaining in a persistent storage a geometrical representation of the first surface.

72. The method of claim 71 further comprising using a multiresolution representation to partially load the model.

73. The method of claim 67 further comprising:

maintaining in a persistent storage a geometrical representation of the first surface.

74. The method of claim 73 further comprising loading on demand from persistent storage into memory that portion of the first surface required and removing from memory that portion of the first surface not required.

75. The method of claim 68 further comprising:

storing for each node a bounding box on a persistent storage device, and storing for each node a list of critical vertices associated with that node on the persistent storage device.

76. The method of claim 70 wherein a tree node is loaded from persistent storage on demand and is removed from memory when no longer required.

77. The method of claim 67 further comprising using a multiresolution representation to partially load the model.

78. The method of claim 67, wherein the multiresolution representation is a tree having multiple levels of nodes and the first surface is a collection of triangles, the method further comprising:

associating with each level-i node a subset of vertices that are critical at resolution level i;

associating with each node a unique key;

associating each triangle to a unique leaf node;

associating with each leaf node the triangles associated to that leaf node; and associating with a level-i node the list of triangles which is the union of all triangles associated with the level-i+1 nodes associated to the level-i node.

79. The method of claim 78 wherein the triangles associated with a tree leaf node are loaded from persistent storage on demand and removed from memory when no longer required.

80. The method of claim 67, further comprising:

storing a grid representation of the first surface, the grid representation being made up of grid cells;

forming a mesh representation of a portion of the first surface by triangulating a subset of the grid cells; and inserting the first surface into the model.

81. The method of claim 67 further characterized by performing at least one operation from the set traversing the multiresolution representation, performing connected component analysis, incrementally updating the model.

82. The method of claim 81 further comprising:

maintaining in a persistent storage a geometrical representation of the first surface.

83. The method of claim 82 further comprising using a multiresolution representation to partially load the model.

84. The method of claim 78 further comprising:

associating to each vertex in a leaf node the key corresponding to that leaf node.

85. The method of claim 84 further comprising:

storing a representation of a second surface in the persistent storage system, the second surface having nodes, leaf nodes, vertices, critical vertices and triangles;

using one or more Boolean operations to classify the second surface into the model.

86. The method of claim 85 further comprising:

determining which leaf nodes of the first surface intersect the leaf nodes of the second surface;

determining a set of intersecting triangles from the first and second surfaces from the triangles associated to the intersecting leaf nodes;

determining a complete node front that contains all the leaf nodes that have intersecting triangles.

87. The method of claim 86, the first surface having a macro-topology comprising zero or more zero-cells, zero or more one-cells, and one or more two-cells, wherein a zero-cell is a point, a one-cell is an edge, and a two-cell is a surface, the method further comprising:

splitting the triangles of the first surface along the intersection curve;

forming new triangles by tessellating the split triangles to respect the macro-topology of one-cells and zero-cells passing through the original triangles;

building a new tree for each new cell;

assigning each new triangle to the leaf node of the tree created for the new cell to which the new triangle belongs;

for each leaf node of each new tree, migrating each triangle in the original tree which is connected to a new triangle in the new tree leaf node and which lies in the same tree leaf node as the new triangle;

determining the neighbors of a tree node by finding all the keys of all the critical vertices in the node; and determining a node which is an ancestor of a key from the critical vertices in the migrated tree nodes and has not been split or migrated and migrating that node to the new tree.

88. A computer system operable to construct a geometric model, having a plurality of surfaces each represented at at least one level of resolution, the computer system comprising:

a processor, a memory, a persistent storage system, at least one input device, at least one output device, logic means for representing a first surface at multiple levels of resolution, and a logic means for using at least one operation, having at least one Boolean operation, to classify the first surface into the model; and a means for performing an operation using the model as input, the operation selected from the set including rendering the model, displaying the model, displaying at least one aspect of the model, displaying the topology of the model and displaying an indication of which surfaces bound said volume of the model, determining the surfaces that bound a volume of the model and displaying an indication of which surfaces lie within said volume of the model, determining the surfaces that lie within a volume of the model, determining fluid flow between compartments of the model, and analyzing geological properties of a geological formation modeled by the model.

89. The computer system of claim 88 further comprising:

logic means for decimating the model while preserving topology of the model.

90. The computer system of claim 88 further characterized by having an operation selected from the set including traversing the multiresolution representation, performing connected component analysis, and incrementally updating the model.

91. The computer system of claim 90 further comprising logic means for using a multiresolution representation to partially load the model.

92. The computer system of claim 89, wherein a complete node front of the tree of the first surface and a collection of vertices on a boundary of the first surface are defined, further comprising:

logic means for building a list of critical vertices from the tree nodes of the complete node front;

logic means for removing from the list those vertices identified to one- or zero-cell vertices;

logic means for adding to the list all zero-cell vertices from the model which lie in the first surface;

logic means for adding to the list the defined collection of one-cell vertices;

logic means for recording the collection of one-cell edges; and logic means for tessellating the surface to respect the list of vertices and the recorded one-cell edges.

93. The computer system of claim 92 further comprising:

logic means for determining a subset of vertices on the boundary of the first surface which are also on the boundary of the second surface;

logic means for determining a subset of vertices on the boundary of the second surface which are also on the boundary of the first surface; and logic means for requiring the subset of vertices on the boundary of the first surface which are also on the boundary of the second surface to be the same as the subset of vertices on the boundary of the second surface which are also on the boundary of the first surface.

94. The computer system of claim 89 further comprising:

logic means for storing a representation of a second surface in the computer-readable media, the second surface having nodes, leaf nodes, vertices, critical vertices and triangles;

logic means for performing one or more Boolean operations to classify the second surface into the model.

95. The computer system of claim 94 further comprising:

logic means for determining which leaf nodes of the first surface intersect the leaf nodes of the second surface;

logic means for determining a set of intersecting triangles from the first and second surfaces from the triangles associated to the intersecting leaf nodes;

logic means for determining a complete node front that contains all the leaf nodes that have intersecting triangles.

96. The computer system of claim 95, the first surface having a macro-topology comprising zero or more zero-cells, zero or more one-cells, and one or more two-cells, wherein a zero-cell is a point, a one-cell is an edge, and a two-cell is a surface, the computer system further comprising:

logic means for splitting the triangles of the first surface along the intersection curve;

logic means for forming new triangles by tessellating the split triangles to respect the macro-topology of one-cells and zero-cells passing through the original triangles;

logic means for building a new tree for each new cell;

logic means for assigning each new triangle to the leaf node of the tree created for the new cell to which the new triangle belongs;

logic means operable to for each leaf node of each new tree, migrating each triangle in the original tree which is connected to a new triangle in the new tree leaf node and which lies in the same tree leaf node as the new triangle;

logic means for determining the neighbors of a tree node by finding all the keys of all the critical vertices in the node; and logic means for determining a node which is an ancestor of a key from the critical vertices in the migrated tree nodes and has not been split or migrated and migrating that node to the new tree.

97. The computer system of claim 88, wherein the multiresolution representation is a tree having multiple levels of nodes and the first surface is a collection of triangles, the computer system further comprising:

logic means for associating with each level-i node a subset of vertices that are critical at resolution level i;

logic means for associating with each node a unique key;

logic means for associating each triangle to a unique leaf node;

logic means for associating with each leaf node the triangles associated to that leaf node; and logic means for associating with a level-i node the list of triangles which is the union of all triangles associated with the level-i+1 nodes associated to the level-i node.

98. The computer system of claim 97 further comprising:

logic means for associating to each vertex in a leaf node the key corresponding to that leaf node.

99. The computer system of claim 97 further comprising logic means for loading the triangles associated with a tree leaf node from persistent storage on demand and logic means for removing the triangles associated with a tree leaf node from memory when no longer required.

100. The computer system of claim 88 further comprising:

logic means for maintaining in a persistent storage a geometrical representation of the first surface.

101. The computer system of claim 100 further comprising logic means for loading on demand from persistent storage into memory that portion of the first surface required and removing from memory that portion of the first surface not required.

102. The computer system of claim 100 logic means for loading a tree node from persistent storage on demand and logic means for removing a tree node from memory when no longer required.

103. The computer system of claim 88 further comprising:

logic means for storing for each node a bounding box on a persistent storage device, and storing for each node a list of critical vertices associated with that node on the persistent storage device.

104. The computer system of claim 88, further comprising:

logic means for storing a grid representation of the first surface, the grid representation being made up of grid cells;

logic means for forming a mesh representation of a portion of the first surface by triangulating a subset of the grid cells; and logic means for inserting the first surface into the model.

105. A computer readable medium comprising:

instructions executable by a computer, wherein the instructions direct the computer to construct a geometric model, having a plurality of surfaces each modeled at least one level of resolution, on a computer having a processor, a memory, a persistent storage system, at least one input device, at least one output device, and instructions to cause a first surface to be represented at multiple levels of resolution; and instructions to use at least one Boolean operation to classify the first surface into the model; and instructions to perform an operation using the model as input, the operation selected from the set including rendering the model, displaying the model, displaying at least one aspect of the model, displaying the topology of the model and displaying an indication of which surfaces bound said volume of the model, determining the surfaces that bound a volume of the model and displaying an indication of which surfaces lie within said volume of the model, determining the surfaces that lie within a volume of the model, determining fluid flow between compartments of the model, and analyzing geological properties of a geological formation modeled by the model.

106. The computer readable medium of claim 105 further comprising:

maintaining in a persistent storage a geometrical representation of the first surface.

107. The computer readable medium of claim 106 further comprising:

instructions for loading on demand from persistent storage into memory that portion of the first surface required and removing from memory that portion of the first surface not required.

108. The computer readable medium of claim 106 comprising:

instructions selected from the set loading a tree node from persistent storage on demand, removing a tree node from memory when the tree node is no longer required, loading the triangles associated with a tree leaf node from persistent storage on demand, and removing a tree leaf node from memory when the tree leaf node is no longer required.

109. The computer readable medium of claim 105 further comprising:

instructions for decimating the model while preserving topology of the model.

110. The computer readable medium of claim 109, wherein a complete node front of the tree of the first surface and a collection of vertices on a boundary of the first surface are defined, further comprising instructions to:

build a list of critical vertices from the tree nodes of the complete node front;

remove from the list those vertices identified to one- or zero-cell vertices;

add to the list all zero-cell vertices from the model which lie in the first surface;

add to the list the defined collection of one-cell vertices;

record the collection of one-cell edges; and tessellate the surface to respect the list of vertices and the recorded one-cell edges.

111. The computer readable medium of claim 110 further comprising instructions to cause the computer to:

determine a subset of vertices on the boundary of the first surface which are also on the boundary of the second surface;

determine a subset of vertices on the boundary of the second surface which are also on the boundary of the first surface; and require the subset of vertices on the boundary of the first surface which are also on the boundary of the second surface to be the same as the subset of vertices on the boundary of the second surface which are also on the boundary of the first surface.

112. The computer readable medium of claim 109 further comprising instructions to:

store for each node a bounding box on a persistent storage device, and storing for each node a list of critical vertices associated with that node on the persistent storage device.

113. The computer readable medium of claim 105 further characterized by having an operation selected from the set including traversing the multiresolution representation, performing connected component analysis, incrementally updating the model.

114. The computer readable medium of claim 105 further comprising using a multiresolution representation to partially load the model.

115. The computer readable medium of claim 105, wherein the multiresolution representation is a tree having multiple levels of nodes and the first surface is a collection of triangles, the computer readable medium further comprises instructions operable to cause the computer to:

associate with each level-i node a subset of vertices that are critical at resolution level i;

associate with each node a unique key;

associate each triangle to a unique leaf node;

associate with each leaf node the triangles associated to that leaf node; and associate with a level-i node the list of triangles which is the union of all triangles associated with the level-i+1 nodes associated to the level-i node.

116. The computer readable medium of claim 115 further comprising instructions to cause the computer to:

determine which leaf nodes of the first surface intersect the leaf nodes of the second surface;

determine a set of intersecting triangles from the first and second surfaces from the triangles associated to the intersecting leaf nodes;

determine a complete node front that contains all the leaf nodes that have intersecting triangles.

117. The computer readable medium of claim 116, the first surface having a macro-topology comprising zero or more zero-cells, zero or more one-cells, and one or more two-cells, wherein a zero-cell is a point, a one-cell is an edge, and a two-cell is a surface, further comprising instructions to cause the computer to:

split the triangles of the first surface along the intersection curve;

form new triangles by tessellating the split triangles to respect the macro-topology of one-cells and zero-cells passing through the original triangles;

build a new tree for each new cell;

assign each new triangle to the leaf node of the tree created for the new cell to which the new triangle belongs;

for each leaf node of each new tree, migrate each triangle in the original tree which is connected to a new triangle in the new tree leaf node and which lies in the same tree leaf node as the new triangle;

determine the neighbors of a tree node by finding all the keys of all the critical vertices in the node; and determine a level node which is an ancestor of a key from the critical vertices in the migrated tree nodes and has not been split or migrated and migrating that node to the new tree.

118. The computer readable medium of claim 105 further comprising instructions to cause the computer to:

store a representation of a second surface in the computer-readable media, the second surface having nodes, leaf nodes, vertices, critical vertices and triangles;

use one or more Boolean operations to classify the second surface into the model.

119. The computer readable medium of claim 105, further comprising instructions to cause the computer to:

store a grid representation of the first surface, the grid representation being made up of grid cells;

form a mesh representation of a portion of the first surface by triangulating a subset of the grid cells; and insert the first surface into the model.

120. A method of constructing a geometric model, having a plurality of surfaces, on a computer having a processor, a memory, a persistent storage system, at least one input device, and at least one output device, comprising:

representing each surface of the model at at least one level of resolution, representing a first surface at multiple levels of resolution;

using at least one operation, consisting of one or more Boolean operations, to classify the first surface into the model; and performing a display operation on the model to present at least one aspect of the model to a user.

121. The method of claim 120 further comprising:

decimating the model while preserving topology of the model.

122. The method of claim 121, wherein a complete node front of the tree of the first surface and a collection of vertices on a boundary of the first surface are defined, further comprising:

building a list of critical vertices from the tree nodes of the complete node front;

removing from the list those vertices identified to one- or zero-cell vertices;

adding to the list all zero-cell vertices from the model which lie in the first surface;

adding to the list the defined collection of one-cell vertices;

recording the collection of one-cell edges; and tessellating the surface to respect the list of vertices and the recorded one-cell edges.

123. The method of claim 122 further comprising:

determining a subset of vertices on the boundary of the first surface which are also on the boundary of the second surface;

determining a subset of vertices on the boundary of the second surface which are also on the boundary of the first surface; and requiring the subset of vertices on the boundary of the first surface which are also on the boundary of the second surface to be the same as the subset of vertices on the boundary of the second surface which are also on the boundary of the first surface.

124. The method of claim 123 further comprising:

maintaining in a persistent storage a geometrical representation of the first surface.

125. The method of claim 124 further comprising using a multiresolption representation to partially load the model.

126. The method of claim 121 further comprising:

storing for each node a bounding box on a persistent storage device, and storing for each node a list of critical vertices associated with that node on the persistent storage device.

127. The method of claim 123 wherein a tree node is loaded from persistent storage on demand and is removed from memory when no longer required.

128. The method of claim 120, wherein the multiresolution representation is a tree having multiple levels of nodes and the first surface is a collection of triangles, the method further comprising:

associating with each level-i node a subset of vertices that are critical at resolution level i;

associating with each node a unique key;

associating each triangle to a unique leaf node;

associating with each leaf node the triangles associated to that leaf node; and associating with a level-i node the list of triangles which is the union of all triangles associated with the level-i+1 nodes associated to the level-i node.

129. The method of claim 128 wherein the triangles associated with a tree leaf node are loaded from persistent storage on demand and removed from memory when no longer required.

130. The method of claim 128 further comprising:

associating to each vertex in a leaf node the key corresponding to that leaf node.

131. The method of claim 130 further comprising:

storing a representation of a second surface in the persistent storage system, the second surface having nodes, leaf nodes, vertices, critical vertices and triangles;

using one or more Boolean operations to classify the second surface into the model.

132. The method of claim 131 further comprising:

determining which leaf nodes of the first surface intersect the leaf nodes of the second surface;

determining a set of intersecting triangles from the first and second surfaces from the triangles associated to the intersecting leaf nodes;

determining a complete node front that contains all the leaf nodes that have intersecting triangles.

133. The method of claim 132, the first surface having a macro-topology comprising zero or more zero-cells, zero or more one-cells, and one or more two-cells, wherein a zero-cell is a point, a one-cell is an edge, and a two-cell is a surface, the method further comprising:

splitting the triangles of the first surface along the intersection curve;

forming new triangles by tessellating the split triangles to respect the macro-topology of one-cells and zero-cells passing through the original triangles;

building a new tree for each new cell;

assigning each new triangle to the leaf node of the tree created for the new cell to which the new triangle belongs;

for each leaf node of each new tree, migrating each triangle in the original tree which is connected to a new triangle in the new tree leaf node and which lies in the same tree leaf node as the new triangle;

determining the neighbors of a tree node by finding all the keys of all the critical vertices in the node; and determining a node which is an ancestor of a key from the critical vertices in the migrated tree nodes and has not been split or migrated and migrating that node to the new tree.

134. The method of claim 120 further characterized by performing at least one operation from the set traversing the multiresolution representation, performing connected component analysis, incrementally updating the model.

135. The method of claim 134 further comprising:

maintaining in a persistent storage a geometrical representation of the first surface.

136. The method of claim 135 further comprising using a multiresolution representation to partially load the model.

137. The method of claim 120 further comprising using a multiresolution representation to partially load the model.

138. The method of claim 120 further comprising:

maintaining in a persistent storage a geometrical representation of the first surface.

139. The method of claim 138 further comprising loading on demand from persistent storage into memory that portion of the first surface required and removing from memory that portion of the first surface not required.

140. The method of claim 120, further comprising:

storing a grid representation of the first surface, the grid representation being made up of grid cells;

forming a mesh representation of a portion of the first surface by triangulating a subset of the grid cells; and inserting the first surface into the model.

141. A computer system operable to construct a geometric model, having a plurality of surfaces each represented at at least one level of resolution, the computer system comprising:

a processor, a memory, a persistent storage system, at least one input device, at least one output device, logic means for representing a first surface at multiple levels of resolution, and a logic means for using at least one operation, having at least one Boolean operation, to classify the first surface into the model; and a display logic means for displaying at least one aspect of the model to a user.

142. The computer system of claim 141 further comprising:

logic means for decimating the model while preserving topology of the model.

143. The computer system of claim 142 further comprising:

logic means for storing a representation of a second surface in the computer-readable media, the second surface having nodes, leaf nodes, vertices, critical vertices and triangles;

logic means for performing one or more Boolean operations to classify the second surface into the model.

144. The computer system of claim 143 further comprising:

logic means for determining which leaf nodes of the first surface intersect the leaf nodes of the second surface;

logic means for determining a set of intersecting triangles from the first and second surfaces from the triangles associated to the intersecting leaf nodes;

logic means for determining a complete node front that contain s all the leaf nodes that have intersecting triangles.

145. The computer system of claim 144, the first surface having a macro-topology comprising zero or more zero-cells, zero or more one-cells, and one or more two-cells, wherein a zero-cell is a point, a one-cell is an edge, and a two-cell is a surface, the computer system further comprising:

logic means for splitting the triangles of the first surface along the intersection curve;

logic means for forming new triangles by tessellating the split triangles to respect the macro-topology of one-cells and zero-cells passing through the original triangles;

logic means for building a new tree for each new cell;

logic means for assigning each new triangle to the leaf node of the tree created for the new cell to which the new triangle belongs;

logic means operable to for each leaf node of each new tree, migrating each triangle in the original tree which is connected to a new triangle in the new tree leaf node and which lies in the same tree leaf node as the new triangle;

logic means for determining the neighbors of a tree node by finding all the keys of all the critical vertices in the node; and logic means for determining a node which is an ancestor of a key from the critical vertices in the migrated tree nodes and has not been split or migrated and migrating that node to the new tree.

146. The computer system of claim 142, wherein a complete node front of the tree of the first surface and a collection of vertices on a boundary of the first surface are defined, further comprising:

logic means for building a list of critical vertices from the tree nodes of the complete node front;

logic means for removing from the list those vertices identified to one- or zero-cell vertices;

logic means for adding to the list all zero-cell vertices from the model which lie in the first surface, logic means for adding to the list the defined collection of one-cell vertices;

logic means for recording the collection of one-cell edges; and logic means for tessellating the surface to respect the list of vertices and the recorded one-cell edges.

147. The computer system of claim 146 further comprising:

logic means for determining a subset of vertices on the boundary of the first surface which are also on the boundary of the second surface;

logic means for determining a subset of vertices on the boundary of the second surface which are also on the boundary of the first surface; and logic means for requiring the subset of vertices on the boundary of the first surface which are also on the boundary of the second surface to be the same as the subset of vertices on the boundary of the second surface which are also on the boundary of the first surface.

148. The computer system of claim 141 further characterized by having an operation selected from the set including traversing the multiresolution representation, performing connected component analysis, and incrementally updating the model.

149. The computer system of claim 148 further comprising logic means for using a multiresolution representation to partially load the model.

150. The computer system of claim 141, wherein the multiresolution representation is a tree having multiple levels of nodes and the first surface is a collection of triangles, the computer system further comprising:

logic means for associating with each level-i node a subset of vertices that are critical at resolution level i;

logic means for associating with each node a unique key;

logic means for associating each triangle to a unique leaf node;

logic means for associating with each leaf node the triangles associated to that leaf node; and logic means for associating with a level-i node the list of triangles which is the union of all triangles associated with the level-i+1 nodes associated to the level-i node.

151. The computer system of claim 150 further comprising:

logic means for associating to each vertex in a leaf node the key corresponding to that leaf node.

152. The computer system of claim 150 further comprising logic means for loading the triangles associated with a tree leaf node from persistent storage on demand and logic means for removing the triangles associated with a tree leaf node from memory when no longer required.

153. The computer system of claim 141 further comprising:

logic means for maintaining in a persistent storage a geometrical representation of the first surface.

154. The computer system of claim 153 logic means for loading a tree node from persistent storage on demand and logic means for removing a tree node from memory when no longer required.

155. The computer system of claim 153 further comprising logic means for loading on demand from persistent storage into memory that portion of the first surface required and removing from memory that portion of the first surface not required.

156. The computer system of claim 141 further comprising:

logic means for storing for each node a bounding box on a persistent storage device, and storing for each node a list of critical vertices associated with that node on the persistent storage device.

157. The computer system of claim 141, further comprising:

logic means for storing a grid representation of the first surface, the grid representation being made up of grid cells;

logic means for forming a mesh representation of a portion of the first surface by triangulating a subset of the grid cells; and logic means for inserting the first surface into the model.

158. A computer readable medium comprising instructions executable by a computer, wherein the instructions direct the computer to construct a geometric model, having a plurality of surfaces each modeled at at least one level of resolution, on a computer having a processor, a memory, a persistent storage system, at least one input device, at least one output device, and instructions to cause a first surface to be represented at multiple levels of resolution; and instructions to use at least one Boolean operation to classify the first surface into the model;

to perform a display operation on the model that presents at least one aspect of the model to a user.

159. The computer readable medium of claim 158 further comprising:

instructions for decimating the model while preserving topology of the model.

160. The computer readable medium of claim 159, wherein a complete node front of the tree of the first surface and a collection of vertices on a boundary of the first surface are defined, further comprising instructions to:

build a list of critical vertices from the tree nodes of the complete node front;

remove from the list those vertices identified to one- or zero-cell vertices;

add to the list all zero-cell vertices from the model which lie in the first surface;

add to the list the defined collection of one-cell vertices;

record the collection of one-cell edges; and tessellate the surface to respect the list of vertices and the recorded one-cell edges.

161. The computer readable medium of claim 160 further comprising instructions to cause the computer to:

determine a subset of vertices on the boundary of the first surface which are also on the boundary of the second surface;

determine a subset of vertices on the boundary of the second surface which are also on the boundary of the first surface; and require the subset of vertices on the boundary of the first surface which are also on the boundary of the second surface to be the same as the subset of vertices on the boundary of the second surface which are also on the boundary of the first surface.

162. The computer readable medium of claim 159 further comprising instructions to:

store for each node a bounding box on a persistent storage device, and storing for each node a list of critical vertices associated with that node on the persistent storage device.

163. The computer readable medium of claim 158 further characterized by having an operation selected from the set including traversing the multiresolution representation, performing connected component analysis, incrementally updating the model.

164. The computer readable medium of claim 158 further comprising using a multiresolution representation to partially load the model.

165. The computer readable medium of claim 158, wherein the multiresolution representation is a tree having multiple levels of nodes and the first surface is a collection of triangles, the computer readable medium further comprises instructions operable to cause the computer to:

associate with each level-i node a subset of vertices that are critical at resolution level i;

associate with each node a unique key;

associate each triangle to a unique leaf node;

associate with each leaf node the triangles associated to that leaf node; and associate with a level-i node the list of triangles which is the union of all triangles associated with the level-i+1 nodes associated to the level-i node.

166. The computer readable medium of claim 165 further comprising instructions to cause the computer to:

determine which leaf nodes of the first surface intersect the leaf nodes of the second surface;

determine a set of intersecting triangles from the first and second surfaces from the triangles associated to the intersecting leaf nodes;

determine a complete node front that contains all the leaf nodes that have intersecting triangles.

167. The computer readable medium of claim 166, the first surface having a macro-topology comprising zero or more zero-cells, zero or more one-cells, and one or more two-cells, wherein a zero-cell is a point, a one-cell is an edge, and a two-cell is a surface, further comprising instructions to cause the computer to:

split the triangles of the first surface along the intersection curve;

form new triangles by tessellating the split triangles to respect the macro-topology of one-cells and zero-cells passing through the original triangles;

build a new tree for each new cell;

assign each new triangle to the leaf node of the tree created for the new cell to which the new triangle belongs;

for each leaf node of each new tree, migrate each triangle in the original tree which is connected to a new triangle in the new tree leaf node and which lies in the same tree leaf node as the new triangle;

determine the neighbors of a tree node by finding all the keys of all the critical vertices in the node; and determine a level node which is an ancestor of a key from the critical vertices in the migrated tree nodes and has not been split or migrated and migrating that node to the new tree.

168. The computer readable medium of claim 158 further comprising instructions to cause the computer to:

store a representation of a second surface in the computer-readable media, the second surface having nodes, leaf nodes, vertices, critical vertices and triangles;

use one or more Boolean operations to classify the second surface into the model.

169. The computer readable medium of claim 158 further comprising:

maintaining in a persistent storage a geometrical representation of the first surface.

170. The computer readable medium of claim 169 further comprising:

instructions for loading on demand from persistent storage into memory that portion of the first surface required and removing from memory that portion of the first surface not required.

171. The computer readable medium of claim 169 comprising:

instructions selected from the set loading a tree node from persistent storage on demand, removing a tree node from memory when the tree node is no longer required, loading the triangles associated with a tree leaf node from persistent storage on demand, and removing a tree leaf node from memory when the tree leaf node is no longer required.

172. The computer readable medium of claim 158, further comprising instructions to cause the computer to:

store a grid representation of the first surface, the grid representation being made up of grid cells;

form a mesh representation of a portion of the first surface by triangulating a subset of the grid cells; and insert the first surface into the model.

* * * * *

UNITED STATES PATENT AND TRADEMARK OFFICE
CERTIFICATE OF CORRECTION

PATENT NO. : 6,313,837 B1
DATED : November 6, 2001
INVENTOR(S) : Assa et al.

It is certified that error appears in the above-identified patent and that said Letters Patent is hereby corrected as shown below:

Drawings,
Replace drawing sheets 5, 6, and 17 with the attached sheets.

Signed and Sealed this

Second Day of March, 2004

JON W. DUDAS
*Acting Director of the United States Patent and Trademark Office*